US012467285B2

(12) United States Patent
Müller

(10) Patent No.: US 12,467,285 B2
(45) Date of Patent: *Nov. 11, 2025

(54) PULL-OUT LOCKING DEVICE FOR DRAWERS

(71) Applicant: Fulterer AG & Co KG, Lustenau (AT)

(72) Inventor: Wolfgang Müller, Lustena (AT)

(73) Assignee: Fulterer AG & Co KG, Lustenau (AT)

( * ) Notice: Subject to any disclaimer, the term of this patent is extended or adjusted under 35 U.S.C. 154(b) by 272 days.

This patent is subject to a terminal disclaimer.

(21) Appl. No.: 18/028,959

(22) PCT Filed: Sep. 14, 2021

(86) PCT No.: PCT/EP2021/075170

§ 371 (c)(1),
(2) Date: Mar. 28, 2023

(87) PCT Pub. No.: WO2022/063627

PCT Pub. Date: Mar. 31, 2022

(65) Prior Publication Data

US 2023/0349197 A1 Nov. 2, 2023

(30) Foreign Application Priority Data

Sep. 28, 2020 (AT) ................................. A 222/2020

(51) Int. Cl.
*E05B 65/463* (2017.01)
*A47B 88/49* (2017.01)
(Continued)

(52) U.S. Cl.
CPC ............ *E05B 65/463* (2013.01); *A47B 88/49* (2017.01); *A47B 88/50* (2017.01); *E05B 65/466* (2013.01)

(58) Field of Classification Search
CPC ..... E05B 65/463; E05B 65/466; A47B 88/45; A47B 88/473; A47B 88/49; A47B 88/50
See application file for complete search history.

(56) References Cited

U.S. PATENT DOCUMENTS 3,799,638 A 3/1974 Faiks
3,941,441 A * 3/1976 Scheerhorn ........... E05B 65/466 312/215

(Continued)

FOREIGN PATENT DOCUMENTS

DE 2341792 A1 2/1974

OTHER PUBLICATIONS

International Search Report (ISR) and Written Opinion for International Application No. PCT/EP2021/075170 mailed Jan. 12, 2022, English Translation of the ISR is included, 10 pages.

*Primary Examiner* — Christopher J Boswell
(74) *Attorney, Agent, or Firm* — Dickinson Wright PLLC

(57) ABSTRACT

A pull-out locking device for pull-out guides of drawers comprises bolt units which each have a base element and a movably mounted bolt part which can be moved by an actuation part which, when an associated pull-out rail is pulled out, is moved together with the pull-out rail starting from the closing position over at least part of the pull-out section, is provided. A cable-like element can be deflected by one of the bolt parts, wherein a deflection reserve is reduced. When a bolt part is moved to a first and to a second actuation position, a deflection reserve of the cable-like element is reduced by a first partial amount and a second partial amount.

15 Claims, 17 Drawing Sheets

(51) Int. Cl.

| | |
|---|---|
| ***A47B 88/50*** | (2017.01) |
| ***E05B 65/466*** | (2017.01) |

(56) References Cited

U.S. PATENT DOCUMENTS

| | | | | | |
|---|---|---|---|---|---|
| 5,176,436 | A * | 1/1993 | Mitchell | ............... | E05B 65/466<br>312/217 |
| 5,199,774 | A * | 4/1993 | Hedinger | .............. | E05B 65/466<br>312/219 |
| 5,427,445 | A * | 6/1995 | Mitchell | ............... | E05B 53/003<br>312/220 |
| 7,850,259 | B2 * | 12/2010 | Chen | ..................... | E05B 65/466<br>312/221 |
| 8,220,879 | B2 * | 7/2012 | Chen | ...................... | A47B 88/46<br>312/334.47 |
| 8,371,664 | B1 * | 2/2013 | Chen | ...................... | A47B 88/43<br>312/221 |
| 10,098,459 | B2 * | 10/2018 | Chen | ..................... | E05B 65/463 |
| 12,139,938 | B2 * | 11/2024 | Müller | .................. | E05B 65/464 |
| 2004/0100165 | A1 * | 5/2004 | Hoffman | ............... | E05B 65/466<br>312/219 |
| 2004/0100166 | A1 | 5/2004 | Hoffman | | |
| 2009/0179534 | A1 | 7/2009 | Chen et al. | | |
| 2011/0176755 | A1 | 7/2011 | Chen et al. | | |

* cited by examiner

Fig. 2
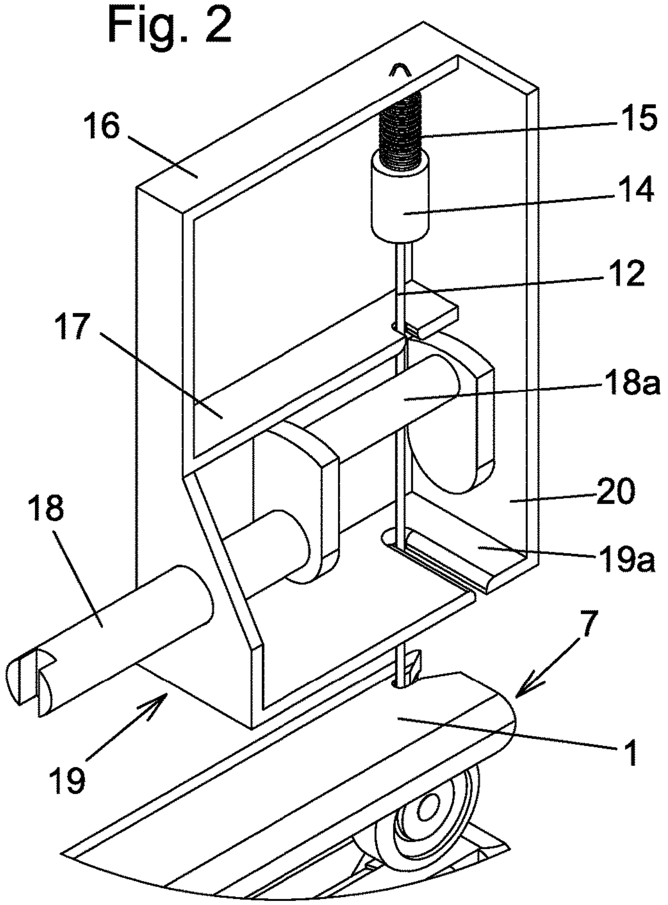
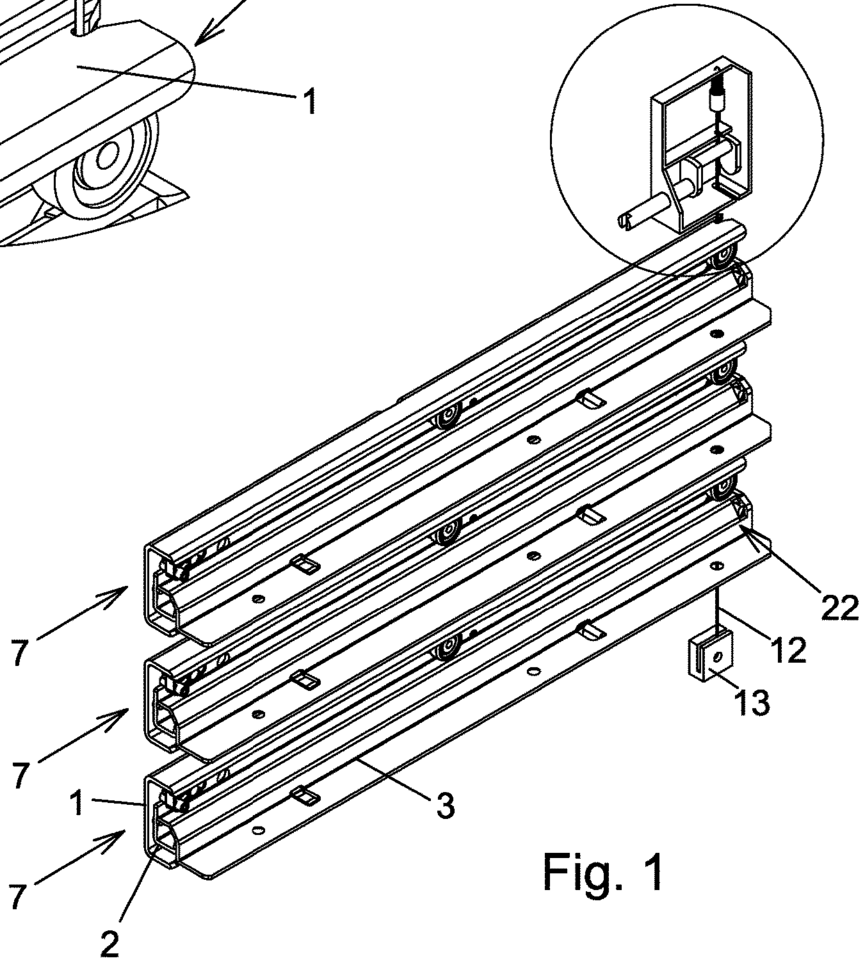
Fig. 1

Fig. 4
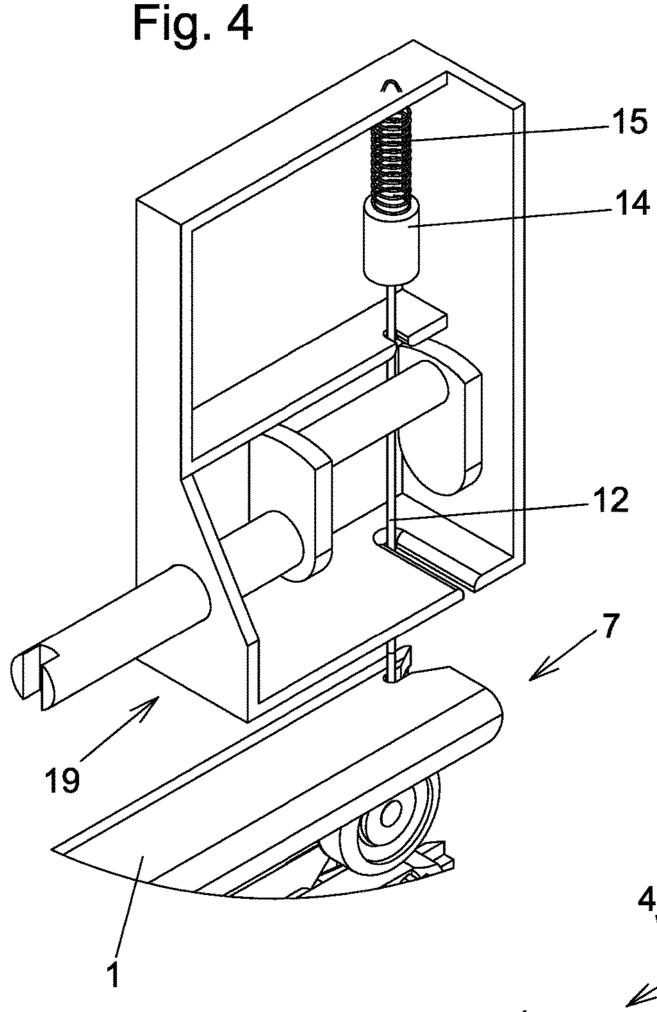
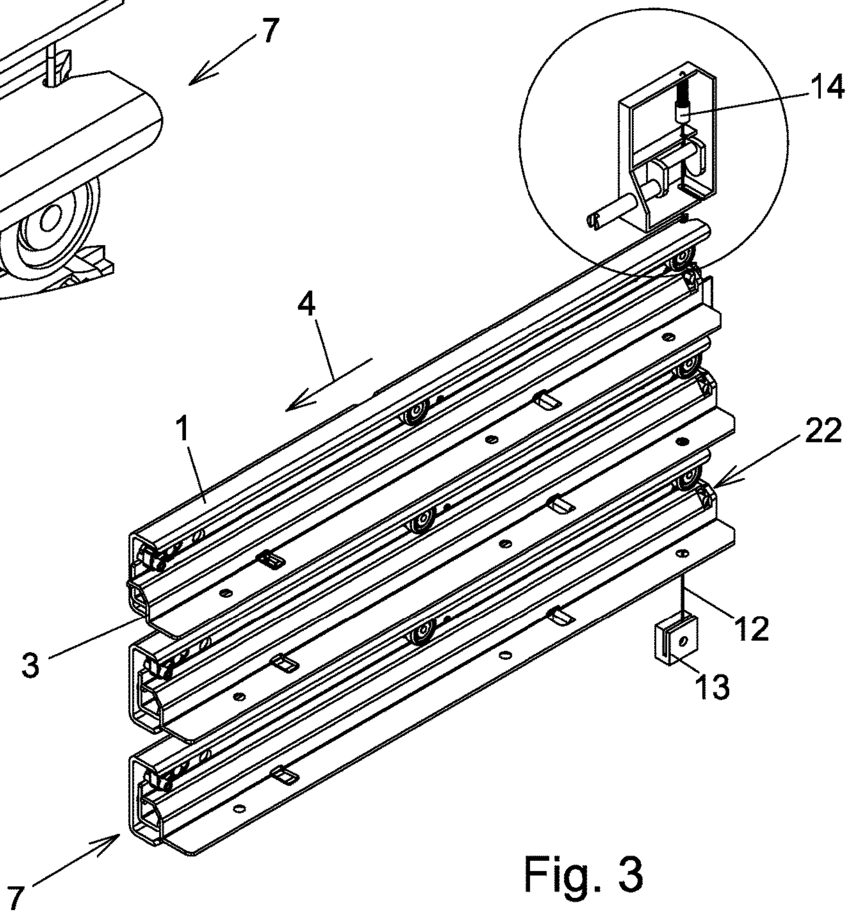
Fig. 3

Fig. 6
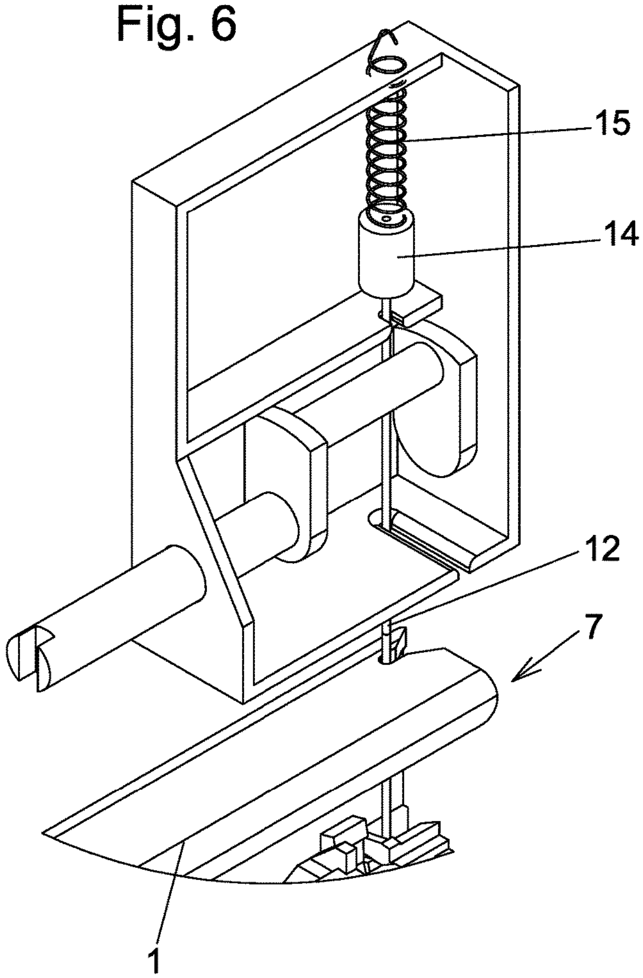
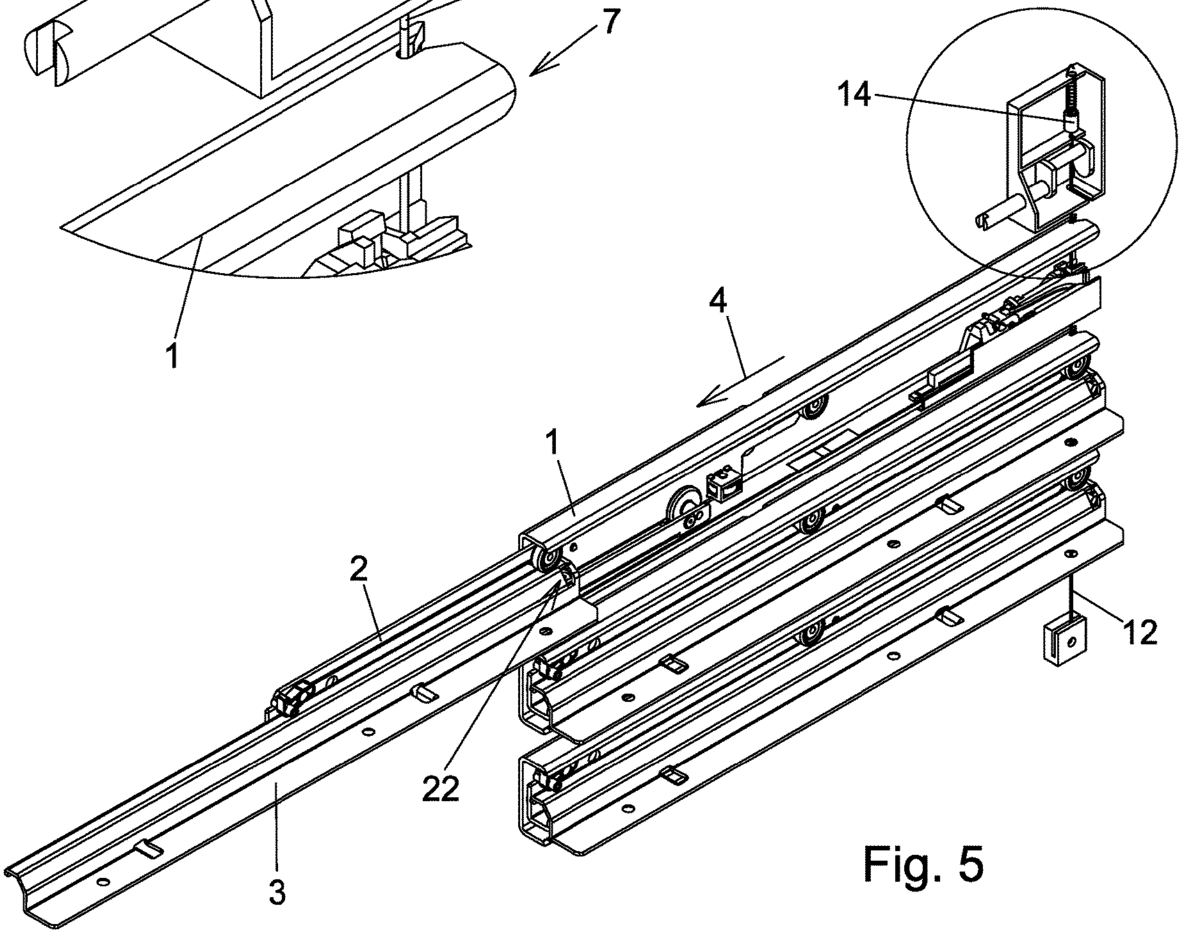
Fig. 5

Fig. 8
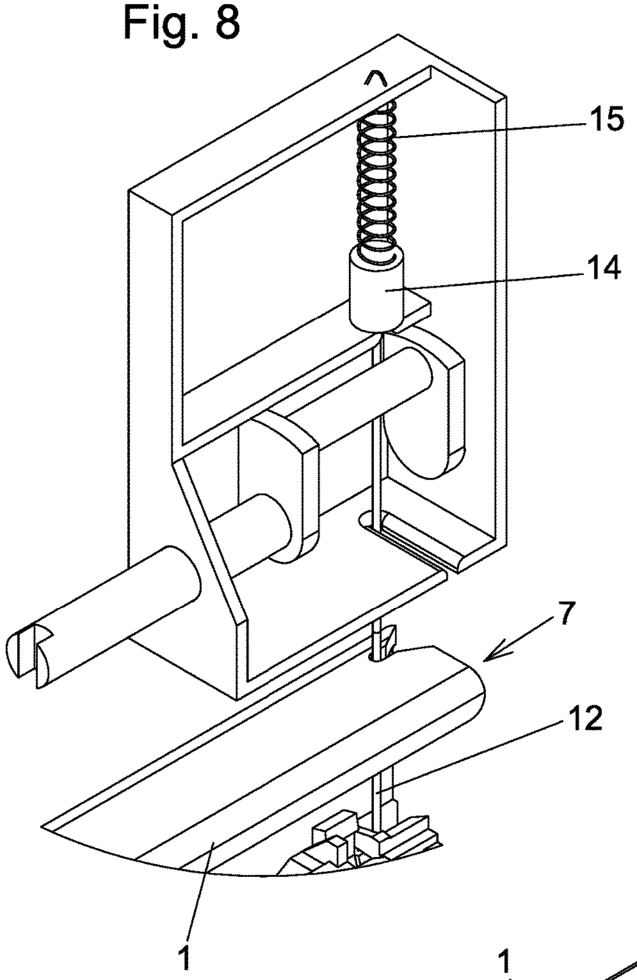
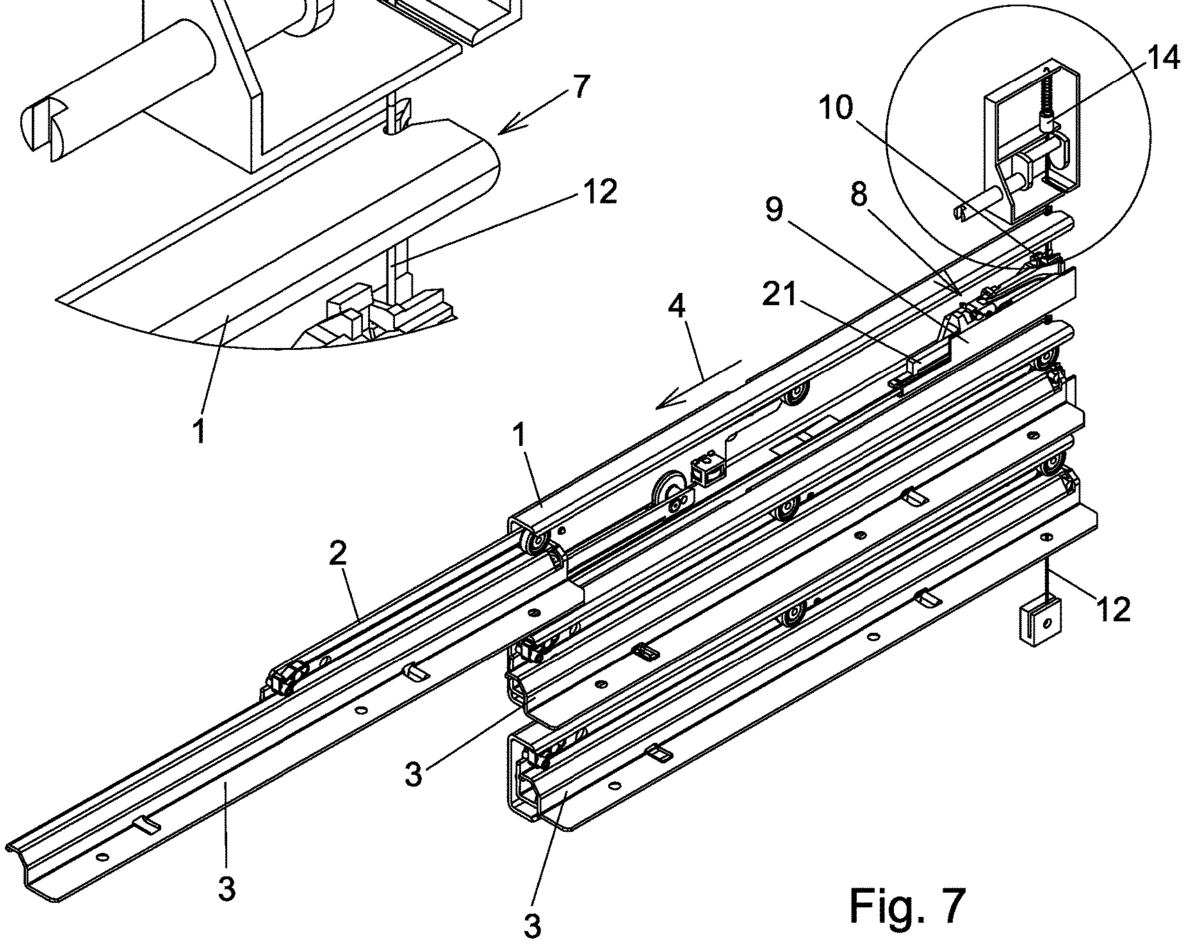
Fig. 7

Fig. 10
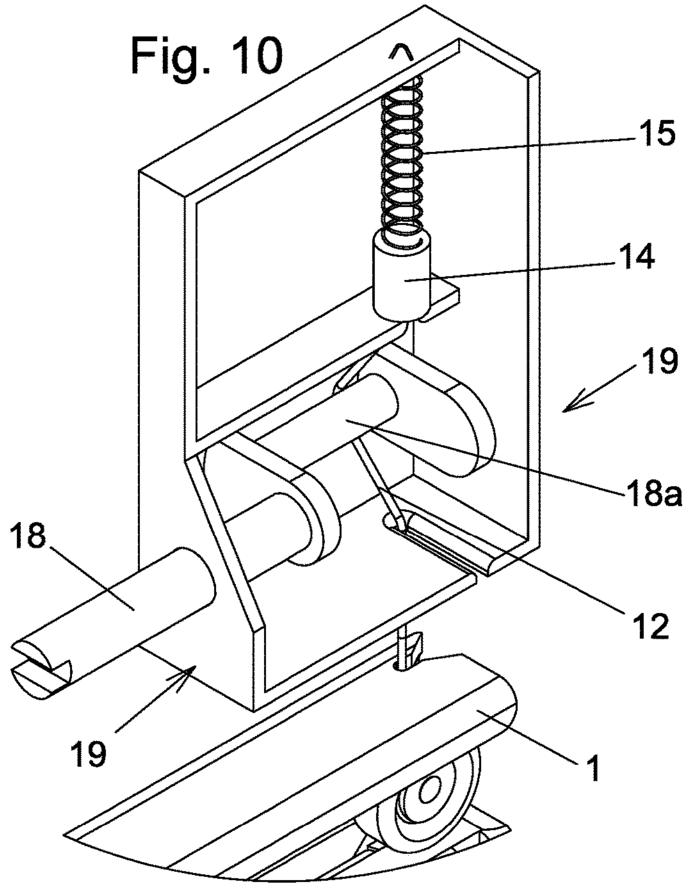
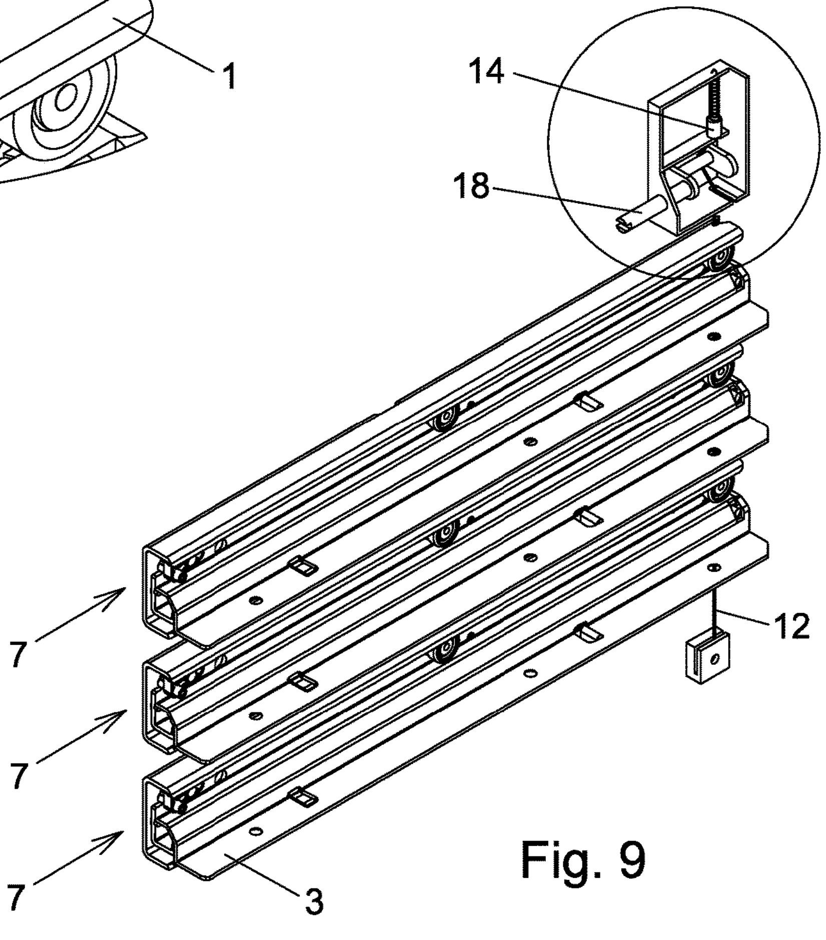
Fig. 9

Fig. 11
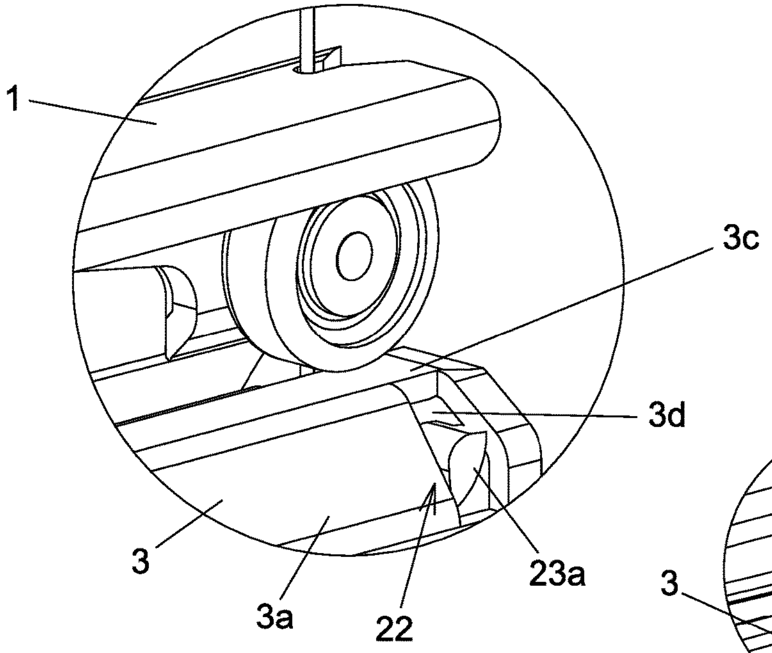
Fig. 12
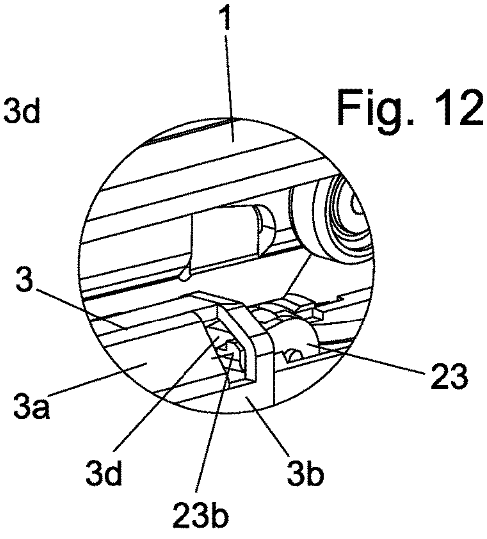
Fig. 13
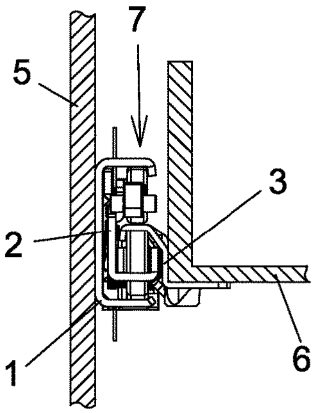
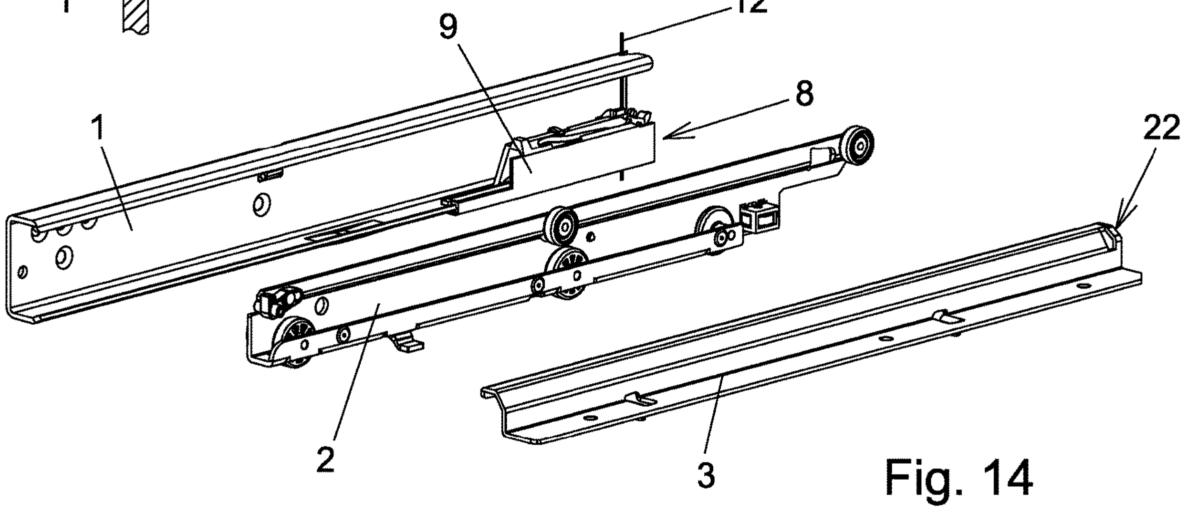
Fig. 14

Fig. 16
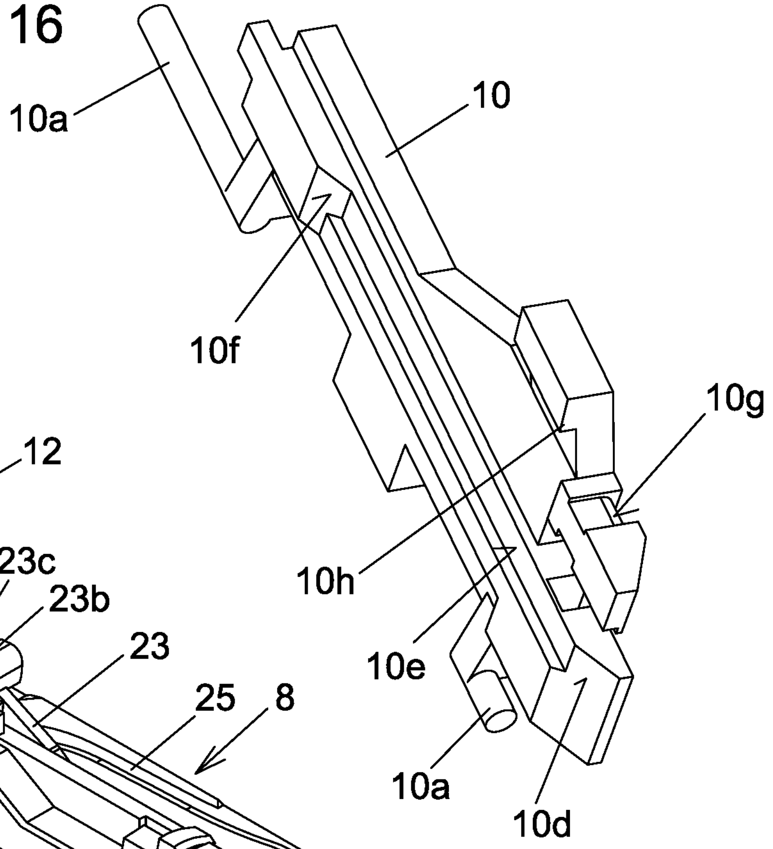
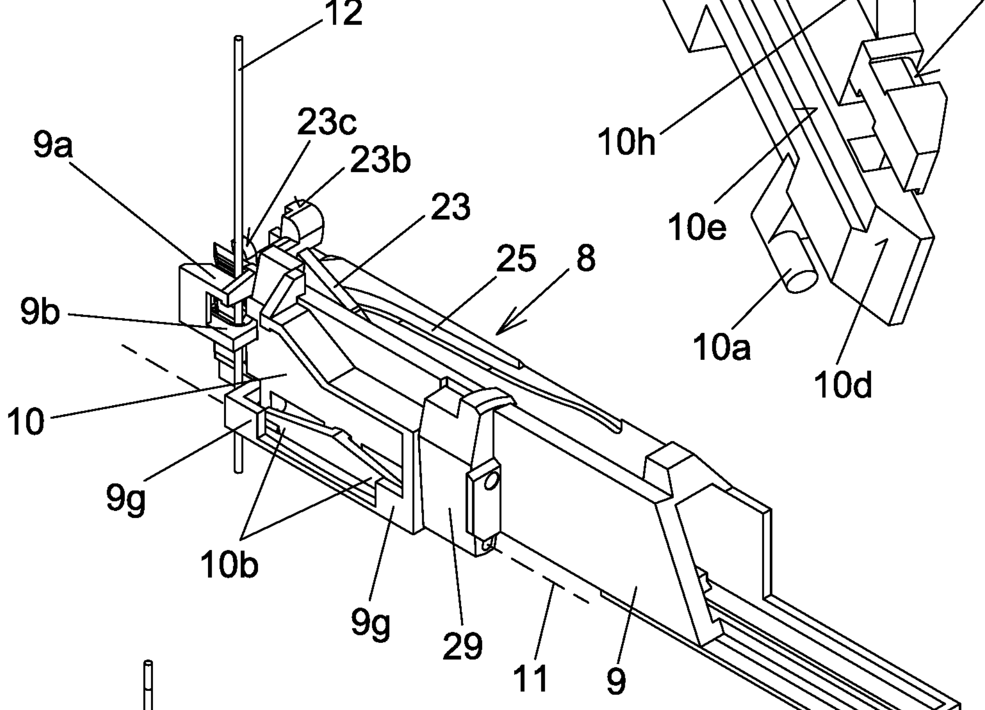
Fig. 18
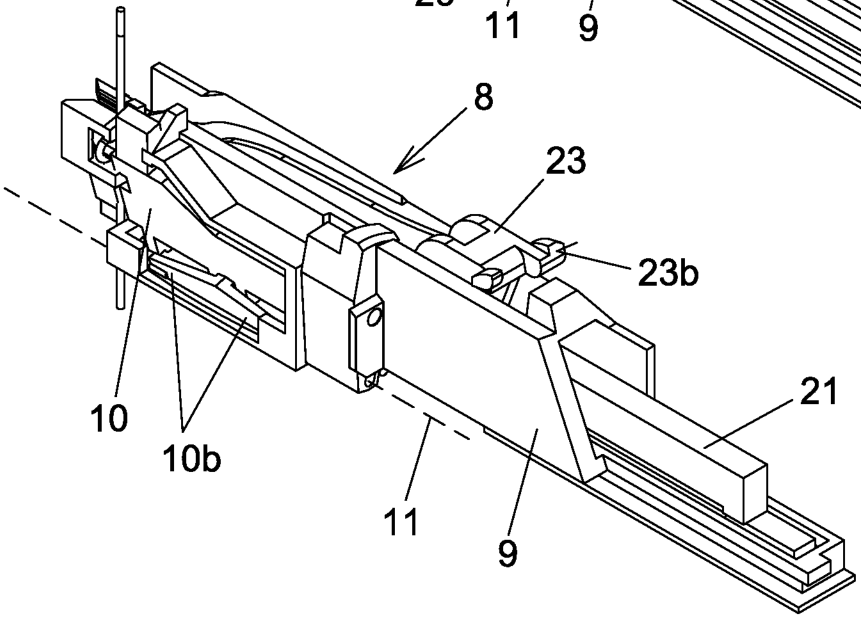
Fig. 19

Fig. 29
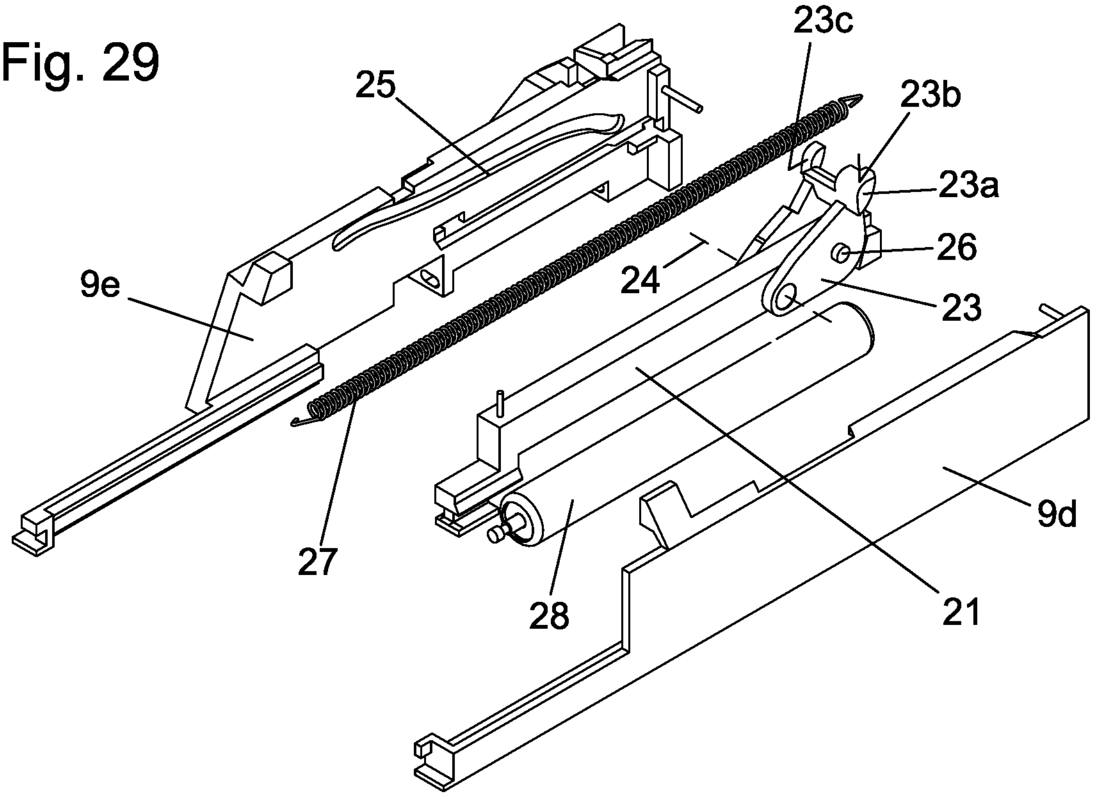
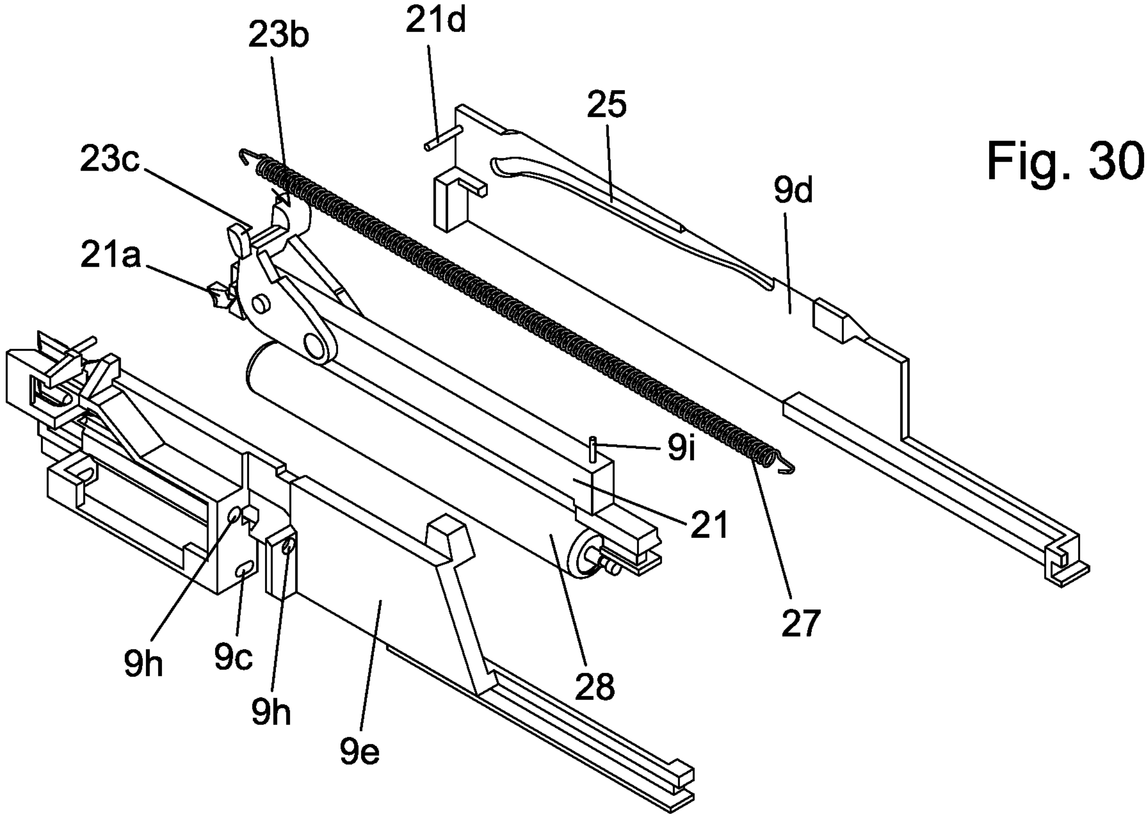
Fig. 30

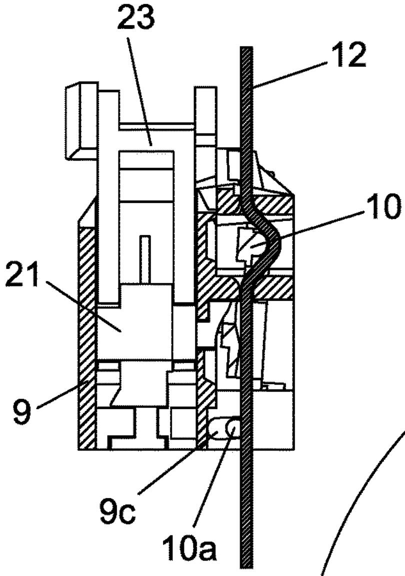
Fig. 39
Fig. 40
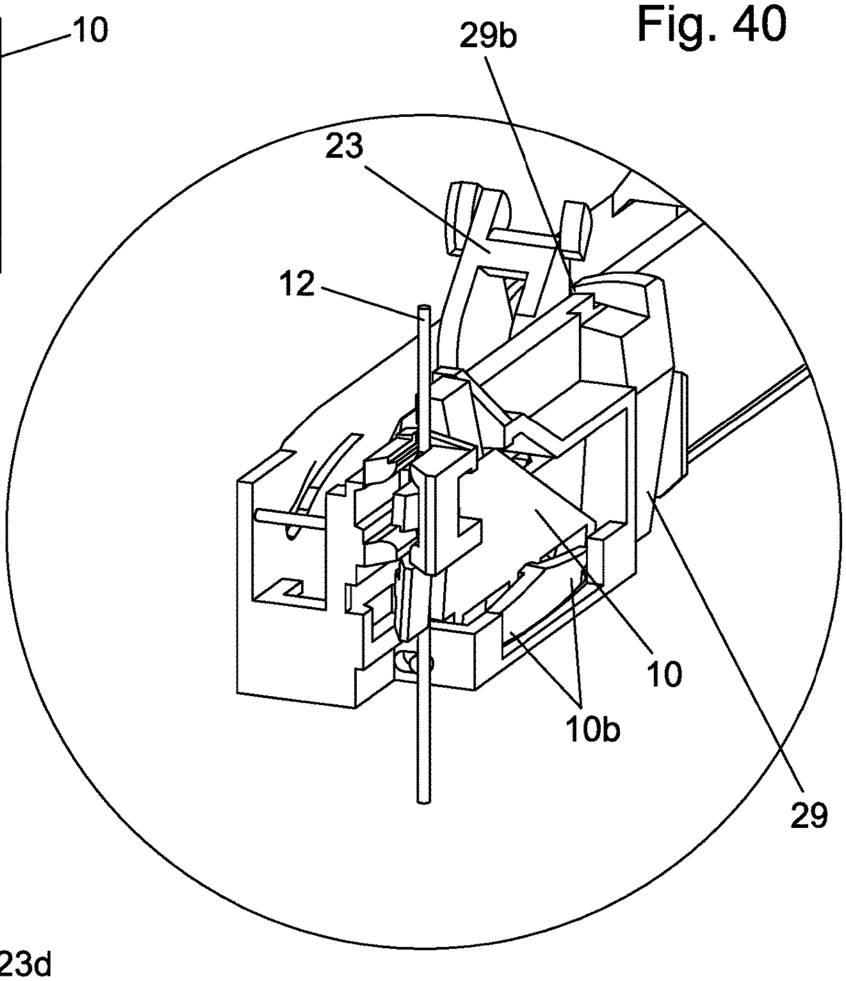
Fig. 41
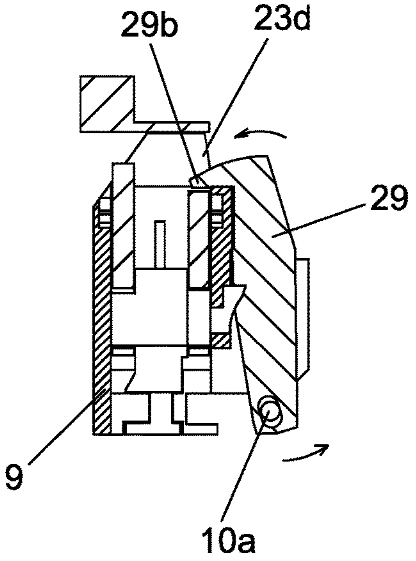
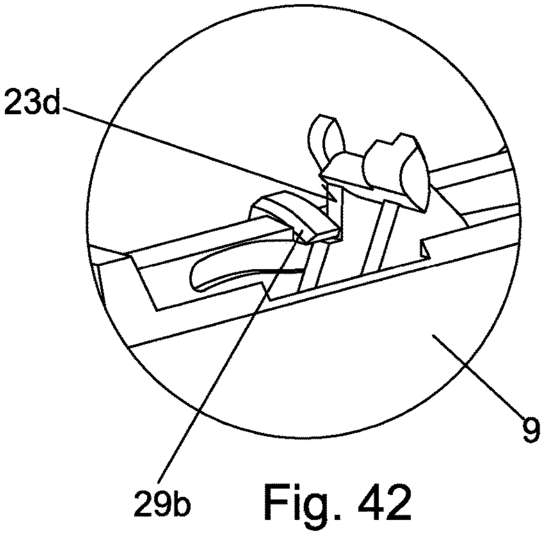
Fig. 42

Fig. 43
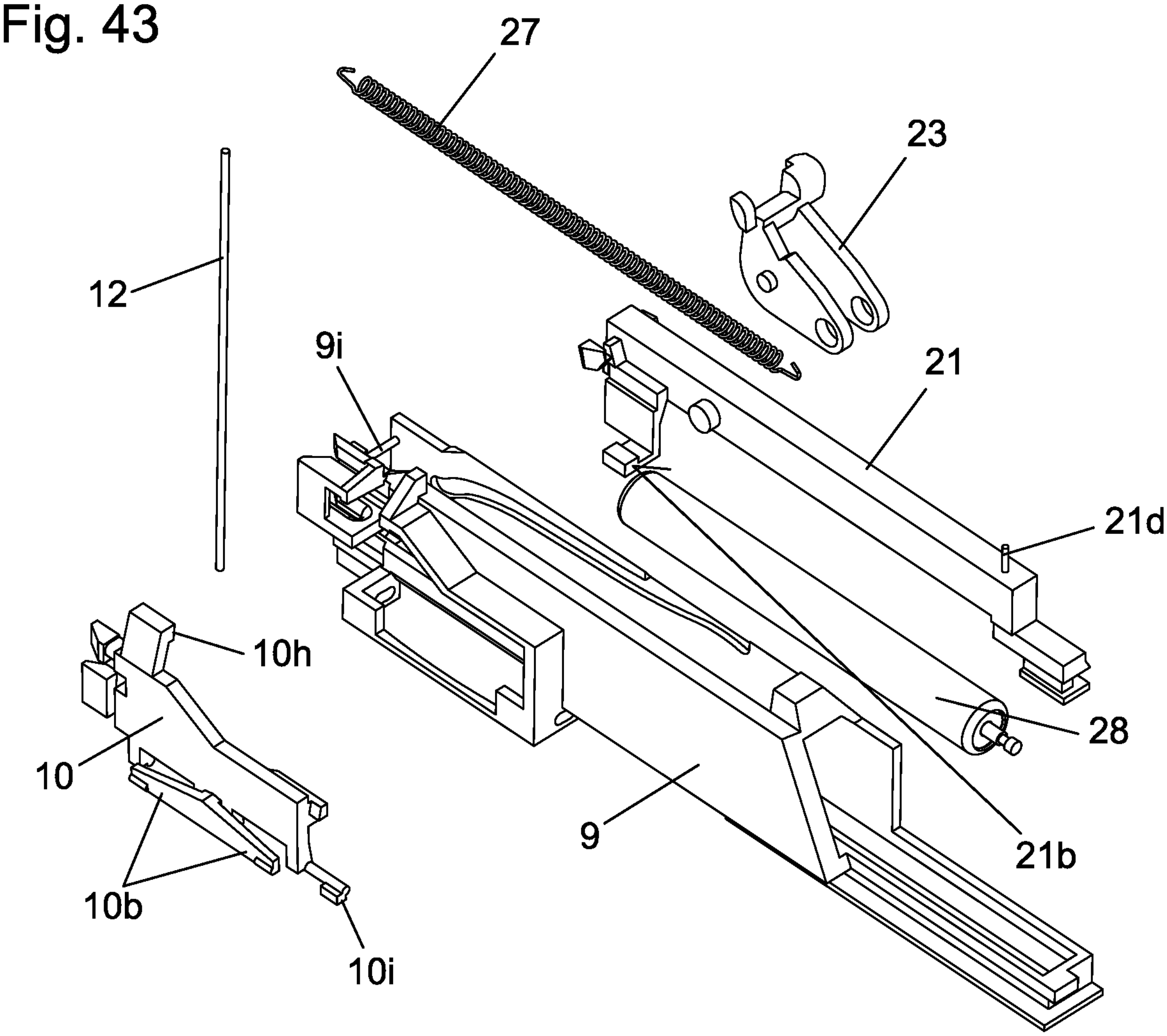
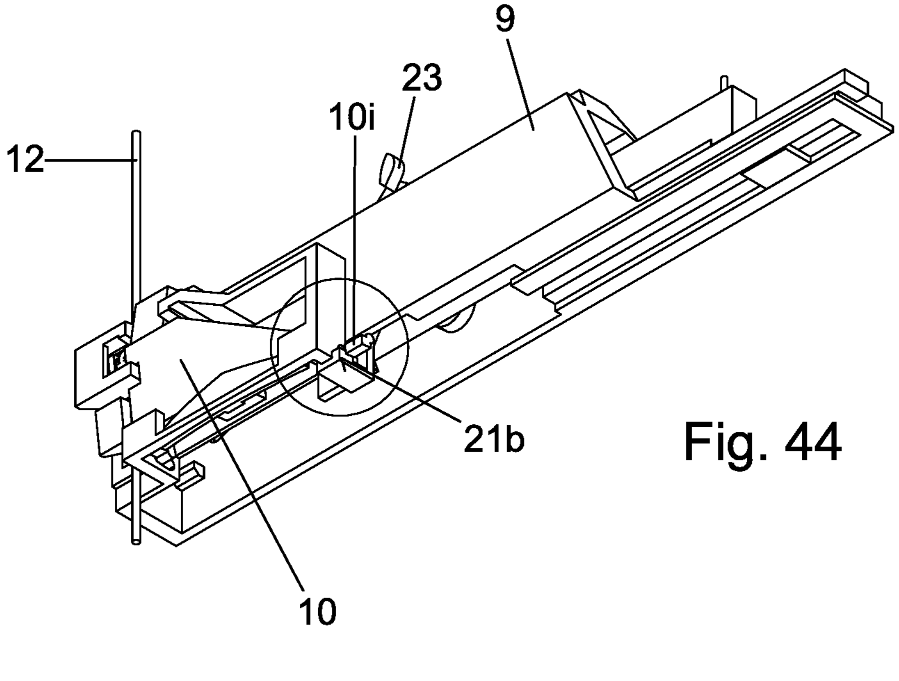
Fig. 44

PULL-OUT LOCKING DEVICE FOR DRAWERS

This U.S. national phase patent application claims priority to PCT/EP2021/075170, filed Sep. 14, 2021, which claims the benefit of Austria (AT) patent application no. A 222/2020, filed Sep. 28, 2020, the entire contents of which are incorporated herein by reference in their entirety.

BACKGROUND

1. Technical Field

The invention relates to a pull-out locking device for drawers comprising at least two pull-out guides each having a carcass rail attachable to a common furniture carcass and a pull-out rail which can be attached to a respective one of the drawers and which can be pulled out in a pull-out direction over a pull-out portion from a closed position into a pull-out position.

2. Related Art

Pull-out locking devices serve to ensure that of multiple drawers arranged one above the other, only one of the drawers can be pulled out at a time, while the other drawers are locked against pulling out. In addition or instead, pull-out locking devices serve to ensure that the drawers, when all of them are in the closed state, can be locked against pulling out from the furniture carcass.

A conventional pull-out locking device is known, for example, from EP 1 500 763 A2. The pull-out guides arranged one above the other, by means of which the drawers can be pulled out of the furniture carcass, are each assigned a bolt unit. The latter has a base body which is attached to the respective carcass rail and by which a bolt part is displaceably mounted. The bolt parts interact with push rods of a combination of push rod. When one of the pull-out rails of the pull-out guides is pulled out, the bolt part is displaced from a passive position into an actuation position in which the push rod interacting with this bolt part is lifted together with any push rods lying thereabove. Lifting of the push rods below is thus blocked. Since the uppermost push rod now rests against a stop, it is also no longer possible to lift push rods lying thereabove. Pulling out a pull-out rail of another pull-out guide is thus blocked by the push rods. To lock all drawers in the closed state, a lock unit can block the uppermost push rod against lifting. This previously known pull-out locking device is combined with a self-retracting device for the pull-out rail. For this purpose, the bolt part is designed as a carriage which is acted upon by a retraction spring. A tilting part is arranged on this carriage, which interacts with an entrainer arranged on the pull-out rail. In the passive position of the bolt part, the entrainer is coupled with the tilting part. In the actuation position of the locking part, the tilting part is tilted and the entrainer can uncouple from the tilting part, whereby a retraction of the bolt part is blocked by a contact surface of the tilting part resting against a retaining surface of the base body. When the drawer is pushed in, the entrainer couples to the tilting part and releases the connection with the retaining surface of the base body, whereupon the bolt part and thus also the entrainer are retracted into the passive position by the retraction spring. Thus, the drawer also is retracted. A disadvantage here is that the user must wait until the pull-out rail is fully retracted before he can pull out another one of the pull-out rails. Since the self-retraction of the pull-out rail is usually damped by a damper, this takes a relatively long time. Self-retraction slide systems in combination with pull-out locking devices have therefore not become established in practice.

Furthermore, pull-out locking devices of the type mentioned above are known in which bolt parts do not interact with push rods but with a cable-like element. This can be, for example, a steel cable or a textile strap. When a bolt part is moved from the passive position to the actuation position, the cable-like element is deflected by the bolt part in the region of the bolt part. A first end of the cable-like element is immovably connected to the furniture carcass. The second end is held against the force of a (weak) tension spring so as to be displaceable to a limited extent. After deflection by a bolt part situated in the actuation position, this second end rests against a stop so that pulling out a further pull-out rail is blocked. In order to lock all drawers in the pushed-in state, the displaceability of the second end of the cable-like element can be blocked by means of a lock unit.

Furthermore, pull-out locking devices in which the bolt parts interact with rotatable push elements are known, for example from WO 2011/146952 A1. A series of such push elements are arranged adjacent to one another in a vertical guide rail. By rotating one of the push elements through the movement of the bolt part from the passive to the actuation position, the push parts arranged above this push part are pushed upwards. A free space arranged above the uppermost push part is thus used up, so that no further push part can be rotated and thus the further drawers are blocked against pulling out.

Self-retracting devices (also called self-retractors or retracting mechanisms) for drawer pull-out guides which, when the drawer is pushed in, automatically retract the drawer over a final section of the retraction path and thus ensure the fully retracted state of the drawer, are widely used and known in various embodiments. For example, AT 401 334 B describes a self-retracting device in which there is a tilt slide which can be displaced against the force of a retraction spring. The tilt slide comprises a carriage mounted to be displaceable parallel to the pull-out direction against the force of the retraction spring and a tilting part arranged for tilting about a tilt axis, which tilting part serves for coupling to an entrainer and uncoupling from the entrainer. In the self-retracting device known from AT 393 948 B, there is a tilt slide which is formed in one piece here and can be displaced along a guideway against the force of the retraction spring. The guideway has a straight section and a curved section, which effects that the tilt slide pivots about an imaginary tilt axis, so that when the drawer is pulled out and the tilt slide reaches a waiting position, the entrainer disengages from the tilt slide. Nowadays, self-retracting devices are usually equipped with dampers to dampen the retracting movement of the extendable furniture part. Such a damped self-retracting device, in which the tilt slide interacts with a retraction damper, is known, for example, from EP 2 129 260 A1.

SUMMARY

It is an object of the invention to provide a pull-out locking device of the type mentioned above, by means of which a high degree of operating comfort is made possible for the user.

In the pull-out locking device according to the invention, when, starting from the basic state of the pull-out locking device in which all pull-out rails are in the closed position, one of the pull-out rails is pulled out over a first actuation portion which adjoins its closed position, the bolt part associated with this pull-out rail is moved from a passive position into a first actuation position by the actuation part which is moved together with the pull-out rail, wherein the deflection reserve is reduced by a first partial amount. When this pull-out rail is pulled out further over an intermediate portion which adjoins the first actuation portion and which is at least three times, preferably at least ten times, longer than the first actuation portion, the bolt part associated with this pull-out rail remains at least substantially in the first actuation position. The fact that the bolt part remains at least substantially in the first actuation position means that the deflection reserve changes by less than 10% of the first partial amount. When the pull-out rail is pulled out further via a second actuation portion which adjoins the intermediate portion, the bolt part associated with this pull-out rail is moved by the actuation part into a second actuation position, wherein the deflection reserve is reduced by a second partial amount. In the state of the pull-out locking device in which one of the pull-out rails is pulled out over the first actuation portion, the intermediate portion and the second actuation portion and a further one of the pull-out rails is pulled out over the first actuation portion (and, if applicable, the intermediate portion) and the remaining ones of the pull-out rails are in the closed position, the deflection reserve is at least substantially used up.

Since the deflection reserve is at least substantially used up, further pulling out of this further pull-out rail is blocked after the intermediate portion (at least after an additional remaining portion explained in more detail below). Pulling out the remaining pull-out rails is also blocked (at least after a remaining portion, which is explained in more detail below).

The design according to the invention makes it possible, when starting from the state in which a first one of the pull-out rails is in the open position and the other ones of the pull-out rails are in the closed position, that when the first pull-out rail is pushed in, a second pull-out rail can already be pulled out as soon as the first pull-out rail has passed the second actuation portion in the direction of the intermediate portion. In doing so, the second pull-out rail can be pulled out up to the open position while the first pull-out rail is still in the intermediate portion or in the region of the first actuation portion.

This makes it possible, for example, that for a user who pushes in one of the drawers with such momentum that it opens again a little bit (into the region of the first actuation portion or the intermediate section), pulling out another one of the drawers is nevertheless not blocked. This represents an advantage, for example, in the case of drawers of tool boxes allowing the possibility of a rapid opening and removal of tools from various drawers.

In particular, however, the invention enables an advantageous combination of a pull-out locking device with a self-retracting device. For this purpose, it is advantageously provided that the actuation parts of the base bodies of the bolt units are each mounted to be movable between a basic position and a waiting position and interact with an entraining device of the respectively associated pull-out rail. In the closed position of the associated pull-out rail, a respective one of the actuation parts assumes the basic position in which the associated entraining device is coupled to the actuation part. When the associated pull-out rail is pulled out over the first actuation portion, the intermediate portion and the second actuation portion, a respective actuation part is moved against the force of a retraction spring up to the waiting position. In the waiting position, the entraining device uncouples from the actuation part, wherein the actuation part is held in the entraining device against the force of the retraction force when the pull-out rail is pulled out further. Holding the actuation part in the waiting position against retraction into the basic position by the retraction spring can preferably be effected by a contact surface of the actuation part or of a part connected thereto (which is non-displaceable relative to the actuation part with respect to the pull-out direction) resting against a retaining surface of the base body, as is known per se in the case of self-retracting devices.

If, when the drawer is pushed in, the entraining device couples to the actuation part, the contact surface is detached from the retaining surface of the base body (in particular by tilting the actuation part or a tilting part connected thereto), whereupon the retraction spring retracts the actuation part to the basic position. It is preferred here that the movement of the actuation part from the waiting position to the basic position is damped by a slide-in damper.

Thus, while one of the pull-out rails is still in the region of the intermediate portion or first actuation portion during retraction by the retraction spring, another one of the pull-out rails can already be fully pulled out. The user does not have to wait for the complete retraction of one of the pull-out rails before another one of the pull-out rails can be pulled out.

In particular, the entraining device is formed by a section of the pull-out rail located in the region of the rear end of the pull-out rail.

In a possible embodiment of the invention, a respective actuation part can be formed by a carriage displaceable in a straight line and parallel to the pull-out direction, on which carriage a tilting part is mounted to be pivotable about an axis perpendicular to the pull-out direction, as is known per se in the case of self-retracting devices. The actuation part and tilting part then together form a kind of two-part tilt slide. In another possible embodiment, the actuation part could be mounted by the base body along curved guideways such that it performs a combined displacement and tilting during the movement from the basic position to the waiting position. Such one-piece tilt slides are also known per se for self-retracting devices.

In order to enable a relatively thin and thus easily bendable design of the cable-like element so that the force required for deflecting the cable-like element can be kept relatively low, it is provided in a preferred embodiment of the invention that in the used-up state of the deflection reserve, the force required for blocking a respective pull-out rail from being pulled out (further) is not applied directly by the cable-like element but by a locking portion which is arranged on the bolt part or is actuated by the bolt part and which rests against a locking surface which is moved together with the pull-out rail (at least over a part of the pull-out portion). The locking surface is advantageously arranged on the actuation part. An arrangement on the pull-out rail is also conceivable and possible.

In particular, it is provided here that in a state of the pull-out locking device in which the deflection reserve is at least substantially used up, a respective one of the pull-out rails that is in the closed position can be pulled out over a remaining portion which is equal to at least the first actuation portion and is less than three times the first actuation portion, wherein during the pulling out over the first actuation portion, a retaining spring arranged in a force transmission path between the bolt part and the base body by which the bolt part is mounted is deformed due to the blocking of the movement of the associated bolt part from the passive position into the first actuation position effected by the cable-like element. After this pull-out rail has been pulled out over the first actuation portion, a locking portion arranged on the associated bolt part or actuated by the bolt part is in a locking position in which it blocks this pull-out rail from being pulled out further by resting against a locking surface at the end of the remaining portion that is moved together with this pull-out rail. When pulling out one of the pull-out rails starting from the basic state of the pull-out locking device, the locking portion is in a release position, at least at the end of the remaining portion, in which the locking portion and the locking surface move past one another as the pull-out rail is pulled out further.

In this case, the remaining portion can coincide with the first actuation portion.

Conveniently, it is further provided that in a state of the pull-out locking device in which the deflection reserve is at least substantially used up, with a first one of the pull-out rails being in the open position and a second one of the pull-out rails being pulled out over the first actuation portion and the intermediate portion, this second pull-out rail can still be pulled out over an additional remaining portion which is equal to at least the second actuation portion and is less than three times the second actuation portion, wherein, when the second pull-out rail is pulled out over the additional remaining portion, the retaining spring is deformed due to the blocking of the movement of the associated bolt part from the first actuation position into the second actuation position, which is effected by the cable-like element. After the second pull-out rail has been pulled out over the second actuation portion, an additional locking portion arranged on the associated bolt part or actuated by the bolt part is in a locking position in which it blocks further pulling out of this pull-out rail after the second pull-out rail has been pulled out over the additional residual portion by resting against the locking surface or against an additional locking surface which is moved together with the second pull-out rail. In a state of the pull-out locking device in which, after one of the pull-out rails has been pulled out over the first actuation portion and the intermediate portion, the deflection reserve is at least equal to the second partial amount, the additional locking portion, at least at the end of the additional remaining portion, is in a release position in which the additional locking portion and the additional locking surface move past one another during the further pulling out of this pull-out rail.

In this case, the additional remaining portion can coincide with the second actuation portion.

In an advantageous embodiment of the invention, the pull-out locking device also has a lock unit from which, starting from the basic state of the pull-out locking device, the deflection reserve can be at least substantially used up by deflecting the cable-like element or by blocking the displaceability of the at least one movably mounted end of the cable-like element. Pulling out the pull-out rails is thus blocked at least at the end of the remaining portion.

In an advantageous embodiment of the invention, the contact surface of a respective bolt part interacting with the cable-like element moves in a direction at least substantially perpendicular (i.e., in a range of 90°+/−15°) to the pull-out direction during the movement from the passive position to the first and second actuation positions.

When the term "cable-like element" is used within this document, it is to be understood to mean any elongate flexible element that can absorb a tensile force but not a compressive force in the longitudinal direction of the element. For example, it can be a cable, e.g. steel cable or plastic rope, a thread, a band, e.g. textile band or plastic band, or a chain.

The locking portion and/or additional locking portion can be a section of the bolt part formed in one piece. However, it is also conceivable and possible to design the locking portion and/or additional locking portion as a separate part which is coupled to the bolt part and is moved by the bolt part as a result of the movement of the bolt part.

In one possible embodiment of the invention, the bolt part is mounted on the base body to be pivotable about a pivot axis which is preferably parallel to the pull-out direction, and the movement between the passive position, the first actuation position and the second actuation position is effected by pivoting about the pivot axis. In such an embodiment, it can be advantageously provided that the pivot axis is displaceable with respect to the base body against the force of the retaining spring in a direction perpendicular to the pivot axis. If, in a state of the pull-out locking device in which the deflection reserve is at least substantially used up, one of the drawers is pulled out over the remaining portion or additional remaining portion, the bolt part can pivot about an axis formed by the contact point of the bolt part on the cable-like element, wherein the pivot axis of the bolt part is pivoted about this axis against the force of the retaining spring.

The locking surface interacting with the locking portion in the locking position of the locking portion can advantageously be arranged on the respective associated actuation part or a tilting part mounted thereon to be pivotable about a tilt axis. An arrangement on the respective associated pull-out rail or a part connected thereto in a non-displaceable manner with respect to the pull-out direction is also possible.

A possible design provides that the additional locking surface is identical to the locking surface and the additional locking portion is spaced apart from the locking portion with respect to the pull-out direction. In another possible design, the additional locking portion could be identical to the locking portion and the additional locking surface could be spaced apart from the locking surface with respect to the pull-out direction.

Advantageously, it is provided that the second partial amount is equal to the first partial amount. Since during the pulling out of one of the pull-out rails over the intermediate portion the associated bolt part remains at least substantially in the first actuation position, the initial value of the deflection reserve is thus at least three times the first partial amount and less than three and a half times the first partial amount. Preferably, the residual distance is 2 mm to 20 mmm. The additional residual distance is preferably 2 mm to 20 mmm.

Advantageously, the first actuation portion is less than one tenth of the total pull-out portion. Preferably, the length of the first actuation portion is in the range of 1 mm to 10 mm.

Advantageously, the second actuation portion is less than one-tenth of the total pull-out portion. Preferably, the length of the second actuation portion is in the range of 1 mm to 10 mm.

In a suitable embodiment of the invention, the first and second actuation portions are equal in size.

The length of the intermediate portion is preferably in the range of 10 mm to 100 mm, particularly preferably in the range of 20 mm to 60 mm.

When in the context of this document reference is made to a deflection of the cable-like element by one of the bolt parts, this means that the cable-like element is displaced in the region of the respective bolt part relative to a zero position which it assumes in the basic state of the pull-out locking device. Conveniently, cable guide sections are located above and below the respective bolt part, so that the course of the cable-like element above the upper cable guide section and below the lower cable guide section is not changed as a result of this. In the deflected state, the cable-like element then has a curvature in the region of the bolt part and, on the other hand, opposite curvatures in the regions of the cable guide sections.

When in the context of this document reference is made to “front” and “rear”, this refers to the pull-out direction.

BRIEF DESCRIPTION OF THE DRAWINGS

Further advantages and details of the invention are explained below with reference to the accompanying drawing. In the figures:

FIG. 1 shows an exemplary embodiment of a pull-out locking device according to the invention with, for example, three pull-out guides arranged one above the other in the basic position of the pull-out locking device, all pull-out rails being in the closed position and the lock unit being unlocked, in oblique view;

FIG. 2 shows an enlarged detail of FIG. 1;

FIG. 3 shows an illustration similar to FIG. 1, with a first one of the pull-out rails (the uppermost) pulled out over the first actuation portion;

FIG. 4 shows an enlarged detail of FIG. 3;

FIG. 5 shows an illustration analogous to FIG. 1 with the first pull-out rail in the pull-out position;

FIG. 6 shows an enlarged detail of FIG. 5;

FIG. 7 shows an illustration analogous to FIG. 1, with the first one of the pull-out rails being in the pull-out position and a second one of the pull-out rails (the second from the top) being pulled out over the first actuation portion;

FIG. 8 shows an enlarged detail of FIG. 7;

FIG. 9 shows an illustration analogous to FIG. 1 in the closed position of all pull-out rails, but in the locking position of the lock unit;

FIG. 10 shows an enlarged detail of FIG. 9;

FIG. 11 shows an enlarged detail in the region of the rear end of a pull-out rail in the closed position;

FIG. 12 shows an enlarged detail in the region of the rear end of a pull-out rail in a coupling position;

FIG. 13 shows a front view of one of the pull-out guides with sections of a furniture carcass to which the carcass rail is attached and a drawer to which the pull-out rail is attached;

FIG. 14 shows one of the pull-out guides in the disassembled state of the rails with the bolt unit attached to the carcass rail and a section of the cable-like element;

FIG. 16 shows an oblique view of the bolt part of the side of the bolt part facing the base body;

FIG. 18 shows an oblique view of one of the bolt units of the side of the bolt unit facing the body rail with a section of the cable-like element, in the basic position of the actuation part;

FIG. 19 shows an illustration analogous to FIG. 18 in the waiting position of the actuation part;

FIG. 29 shows an oblique view of the base body, cut apart at the longitudinal center and with the parts pulled apart, and of the actuation part;

FIG. 30 shows an illustration analogous to FIG. 29 from a different viewing direction;

FIG. 39 shows a section along the line C-C of FIG. 20 after the associated pull-out rail has been pulled out over the additional remaining portion in the used-up state of the deflection reserve;

FIG. 40 shows an oblique view of a rear part of the bolt unit in the state corresponding to FIG. 39;

FIG. 41 shows a sectional view along line D-D of FIG. 20 in the state corresponding to FIGS. 39 and 40;

FIG. 42 shows an oblique view of a part of the bolt unit in the state of FIGS. 39 and 40 from the opposite side as FIG. 40 in the region of the additional locking portion;

FIG. 43 shows an exploded view of the bolt unit according to a modified embodiment of the invention;

FIG. 44 shows an oblique view of the bolt unit in the state of the additional locking portion resting against the additional locking surface (the retraction spring and the slide-in damper are omitted for simplicity);

DETAILED DESCRIPTION OF EXAMPLE EMBODIMENTS

Figure 15:
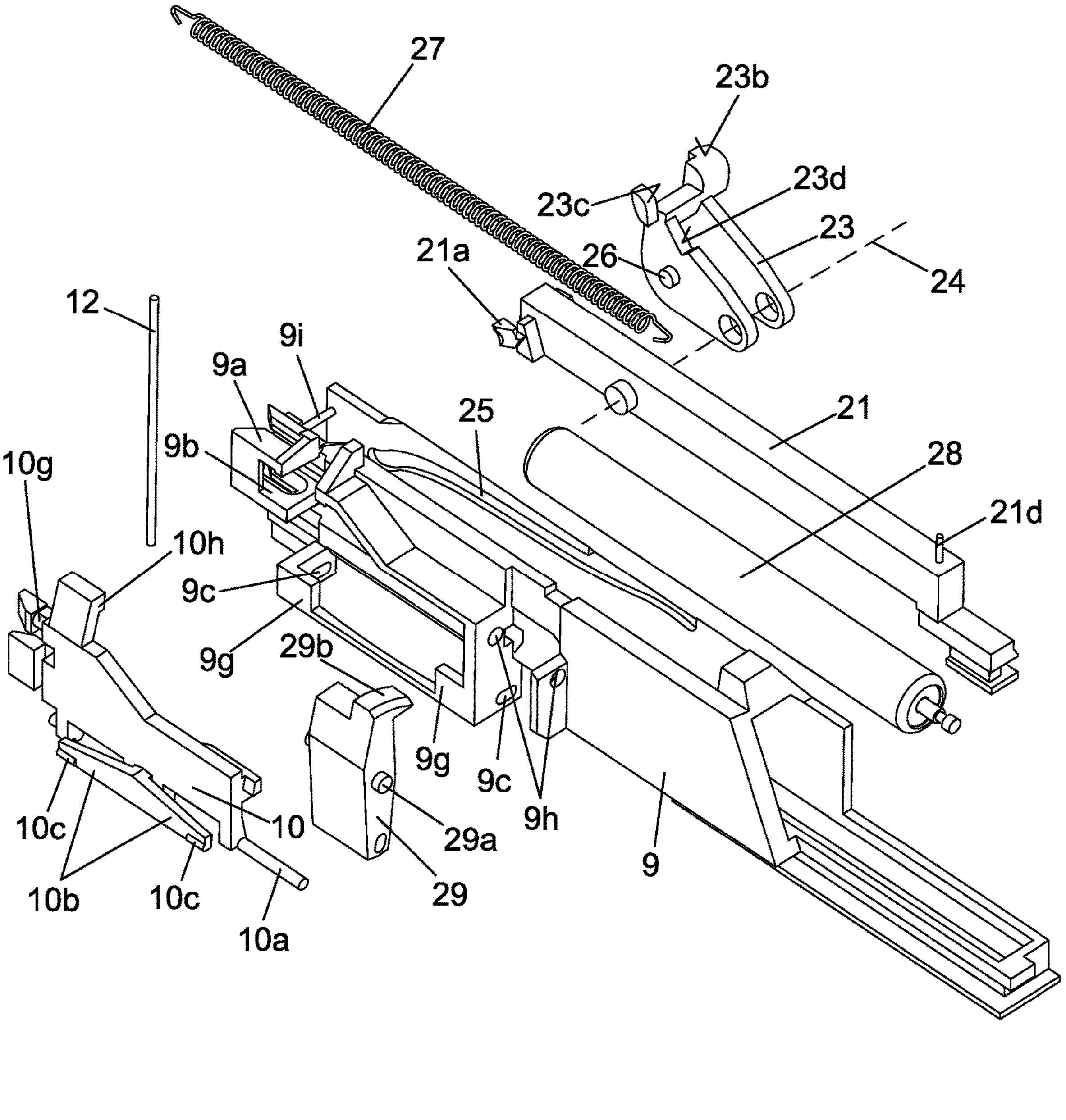
FIG. 15 shows an exploded view of the bolt unit and the section of the cable-like element.
Figure 17:
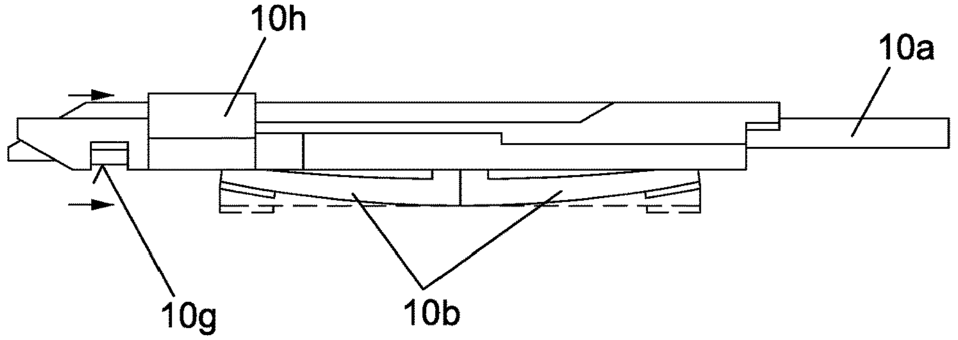
FIG. 17 shows a top view of the bolt part, with the retaining spring shown in solid lines in the deformed state and in dashed lines in the undeformed state (without the influence of an external force)
Figure 20:
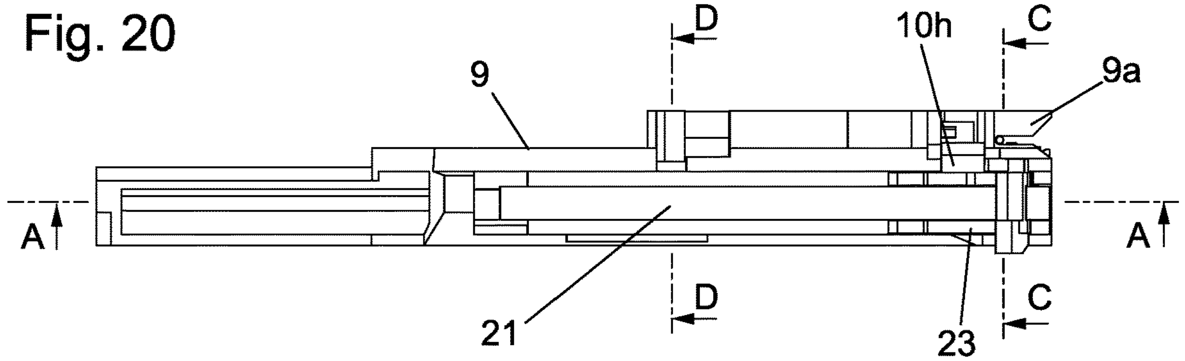
FIG. 20 shows a top view of the bolt unit in the basic position of the actuation part.
Figure 21:
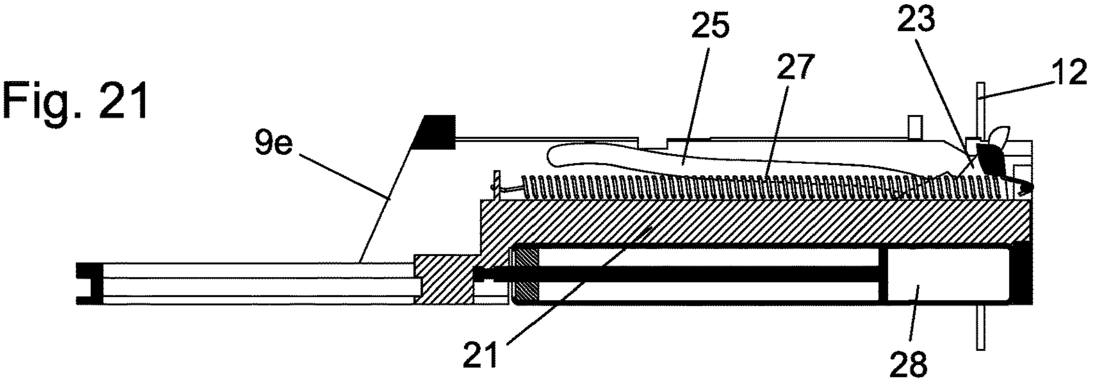
FIG. 21 shows a section along line A-A of FIG. 20.

A first exemplary embodiment of the invention is illustrated in FIGS. 1 to 42. Shown is a pull-out locking device for drawers according to the invention, wherein parts of the pull-out locking device are integrated in multiple, in particular three or more, pull-out guides 7 arranged one above the other.

In the exemplary embodiment shown, the pull-out guides each comprise a carcass rail 1, a center rail 2 and a pull-out rail 3, cf. in particular FIG. 14. The pull-out guides are designed here in the manner of differential pull-out guides, in which the center rail 2 in each case covers half the path of the pull-out rail 3 during pulling out and pushing in. As illustrated, all rollers can be arranged on the center rail 2. The pull-out guides can be designed in a conventional manner and the arrangement of the rollers and their mode of operation do not have to be explained in more detail here.

A pull-out locking device according to the invention can also be integrated in other types of pull-out guides, for example also in pull-out guides which have only one carcass rail and one pull-out rail.

The pulling out of the respective pull-out rail 3 starting from the completely pushed-in state takes place in a pull-out direction 4, and the pushing in of the pull-out rail 3 takes place against the pull-out direction 4.

Only FIG. 13 shows a section of a furniture carcass 5 to which the carcass rails 1 of the pull-out guides 7 are to be mounted. Also shown in FIG. 13 is a part of a drawer 6 on which the pull-out rail 3 of the pull-out guide 7 shown in FIG. 9 is mounted. The pull-out rails 3 of the other pull-out guides 7 are mounted on drawers 6 in an analogous manner.

On each of the pull-out guides 7, a bolt unit 8 is mounted. For this purpose, a base body 9 of the respective bolt unit 8 is fixed to the carcass rail 1, namely in the region of a rear end of the carcass rail 1.

The bolt units each have a bolt part 10 movably mounted on the base body 9 and an actuation part 21 interacting with the bolt part. The actuation part 21 serves to move the bolt part 10.

Figure 22:
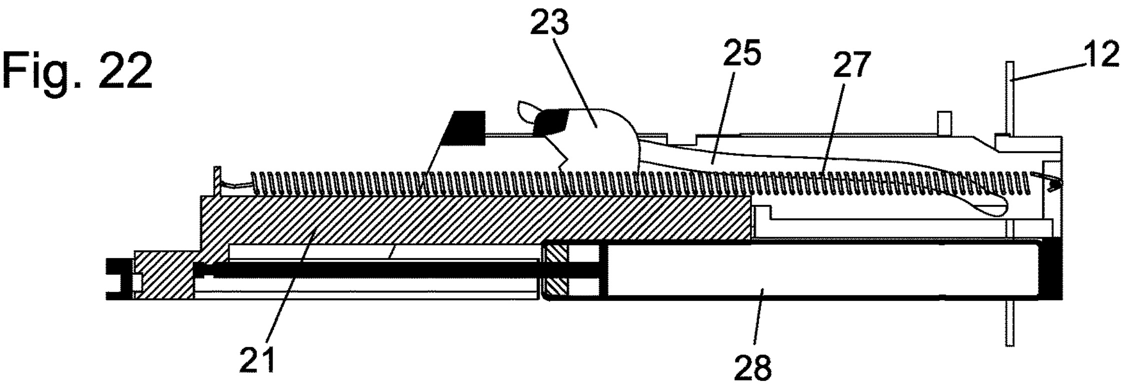
FIG. 22 shows a section analogous to FIG. 21 in the waiting position of the actuation part.

The actuation part 21 of a respective bolt unit 8 is mounted by the base body 9 of this bolt unit 8 to be movable between a basic position and a waiting position. In the closed position of the associated pull-out rail 3, the actuation part 21 is in the basic position, cf. FIGS. 11, 18, 20, 21, 23 and 26. When pulling out the pull-out rail 3, the actuation part 21 is initially entrained by an entraining device 22 of the pull-out rail 3, starting from the closed position of the pull-out rail 3, until the actuation part 21 reaches the waiting position. The pull-out rail 3 then assumes a coupling position between the closed position and the pull-out position. In the waiting position, the entraining device 22 previously coupled to the actuation part 21 can uncouple from the actuation part 21. When the pull-out rail 3 is pulled out further, the actuation part 21 remains in the waiting position. In FIGS. 12, 19 and 22, the actuation part 21 is in the waiting position.

In the exemplary embodiment, the actuation part 21 is guided by the base body 9 so that it can be displaced parallel to the pull-out direction 4 and is displaced parallel to the pull-out direction 4 during the movement from the basic position to the waiting position. The actuation part 21 could thus also be referred to as a carriage or slider. A tilting part 23 is mounted on the actuation part 21 so that it can be tilted (=pivoted) about a tilt axis 24 running perpendicular to the pull-out direction 4. In the end region of the displacement of the actuation part before reaching the waiting position, the tilting part 23 is tilted about the tilt axis 24. For this purpose, the base body 9 has slotted tracks 25 in which guide pins 26 of the tilting part engage which project on both sides. The actuation part 21 together with the tilting part 23 could thus also be referred to as a tilt slide.

The actuation part 21 is acted upon by a retraction spring 27 in the direction of the basic position. The retraction spring 27 engages on an engagement section 9*i* of the base body 9 and an engagement section 21*d* of the actuation part 21. Instead of directly engaging on the actuation part 21, the retraction spring 27 could also engage on a part connected to the actuation part 21, for example the tilting part 23.

A slide-in damper 28 acts against a movement of the actuation part 21 from the waiting position in the direction of the basic position. The slide-in damper is connected on the one side to the base body 9 and on the other side to the actuation part 21 (possibly via a part connected to the latter).

The retraction spring 27 and the slide-in damper 28 can be seen in FIGS. 21, 22, 29, 30 and 43. In the other figures they are omitted for clarity if they would have been visible at all.

In the exemplary embodiment, the entraining device 22 interacting with the actuation part 21 via the tilting part 23 and formed in the region of the rear end of the respective pull-out rail 3 has a slot 3*d* arranged in a web 3*a* of the pull-out rail 3, which connects a vertical web 3*b* of the pull-out rail 3 to a horizontal web 3*c* of the pull-out rail. This is in particular apparent from FIGS. 11 and 12. The horizontal web 3*c* forms a track for rollers of the center rail. The web 3*a* connecting the vertical web 3*b* to the horizontal web 3*c* is formed to be inclined in the region in front of the slot 3*d*. In the region behind the slot 3*d*, this web 3*a* has a raised web section. The front edge of the slot 3*d* is thus lower (closer to the tilt axis 24 of the tilting part 23) than the rear edge.

In the basic position of the actuation part 21, a projection 23*a* of the tilting part 23 protrudes into the slot 3*d*, cf. in particular FIG. 11. When pulling out the pull-out rail 3 starting from the closed position, the entraining device 22 thus initially entrains the tilting part 23 and thus the actuation part 21 in the pull-out direction 4. When the tilting part 23 is entrained, it is pivoted shortly before the actuation part 21 reaches the waiting position to such an extent that the projection 23*a* of the tilting part 23 can move out of the slot 3*d*. This moving out takes place in a coupling position of the pull-out rail, cf. in particular FIG. 12.

In the waiting position of the actuation part 21, a retraction of the actuation part 21 in the direction of the basic position effected by the retraction spring 27 is blocked. For this purpose, the tilting part 23 is tilted beyond a dead center by the interaction of the guide pins 26 with the slotted tracks 25 of the base body 9. The side walls of the slotted tracks 25 thus form retaining surfaces of the base body 9 for contact surfaces of the guide pins 26, whereby the retraction of the actuation part 21 by the retraction spring 27 is blocked.

When the pull-out rail 3 is pushed in starting from the pull-out position, coupling of the entraining device 22 to the actuation part 21 takes place in the coupling position of the pull-out rail 3. For this purpose, an abutment surface 23*b* of the tilting part 23 abuts against the front edge of the slot 3*d*, as a result of which pivoting of the tilting part 23 takes place and the projection 23*a* extends into the slot 3*d*. The blocking of the actuation part 21 against retraction by the retraction spring 27 is thus also removed, so that the pull-out rail 3 is retracted by the retraction spring 27 over a pull-in portion from the coupling position to the closed position.

The pulling in of the pull-out rail 3 is damped by the slide-in damper 28.

The actuation part 21 of a respective bolt unit 8 has an actuation cam 21*a* via which it interacts with the bolt part 10 of this bolt unit 8.

In the exemplary embodiment, the bolt part 10 of a respective bolt unit 9 is pivotable about a pivot axis 11 running parallel to the pull-out direction 4, and the pivot axis 11 itself is movable in the exemplary embodiment, namely displaceable in a direction perpendicular to the pull-out direction 4. The pivot axis 11 could thus also be referred to as a pivot-sliding axis.

In the exemplary embodiment, the pivot axis 11 of the bolt part 10 is formed by stub axles 10*a* of the bolt part 10 (cf. e.g. FIGS. 15 and 31), which engage in axle recesses 9*c* of the base body 9 (cf. e.g. FIG. 15). The axle recesses 9*c* are in the form of elongated holes. The bolt part 10 has resiliently bendable arms which form a retaining spring 10*b*. As illustrated (cf. e.g. FIG. 15), curved projections 10*c*, with which the arms 10*b* rest against contact sections 9*g* of the base body 9, can be arranged on the spring-elastic arms 10*b*. Without the action of an external force, the retaining spring 10*b* formed by the arms holds the stub axles 10*a* in abutment against the ends of the axle recesses 9*c* facing the actuation part 21. The stub axles 10*a* are displaceable against the force of the retaining spring 10*b* in the direction away from the actuation part 21.

As is apparent in particular from FIGS. 16 and 26-28, for interaction with the associated actuation part 21, the bolt part 10 has a first inclined surface 10*d* extending obliquely to the pull-out direction 3 at a first angle, an adjoining intermediate surface 10*e*, and a second inclined surface 10*f* adjoining the latter and extending obliquely to the pull-out direction 4 at a second angle. The intermediate surface 10*e* extends parallel to the pull-out direction 4. The first angle and the second angle are advantageously in the range between 25° and 50°. In the exemplary embodiment, the first and second angles are equal.

In the basic position of the associated actuation part 21 (i.e. in the closed position of the associated pull-out rail 3), the bolt part 10 assumes a passive position, cf. FIGS. 23 and 26 and FIGS. 31 and 32. In the passive position of a respective bolt part 10, the stub axles 10*a* are resting against the ends of the axle recesses 9*c* facing the actuation part 21.

Figure 24:
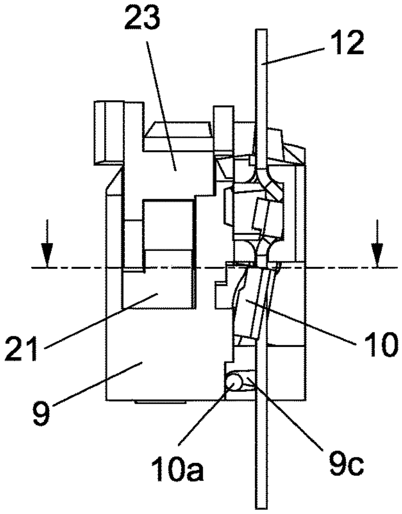
FIG. 24 shows a view analogous to FIG. 23 but in the first actuation position of the bolt part.
Figure 26:
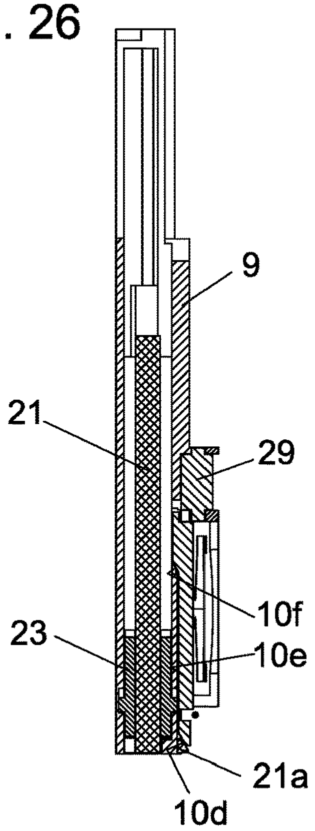
FIG. 26 shows a section along the line B-B of FIG. 23.
Figure 27:
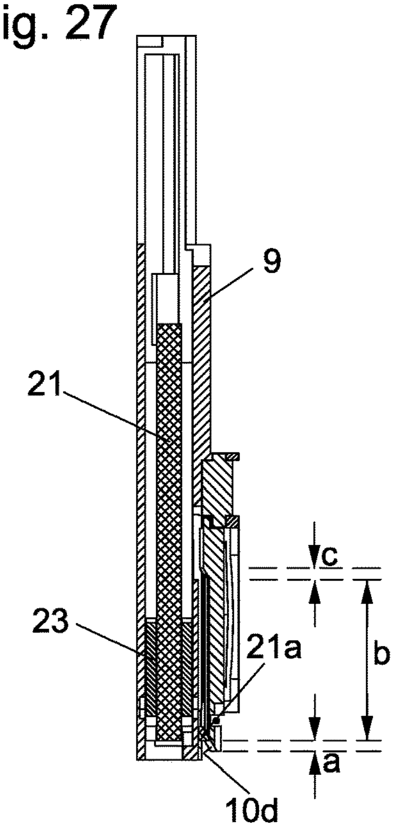
FIGS. 27 and 28 show sections analogous to FIG. 26 but in the first and second actuation positions of the bolt part.

If one of the pull-out rails is pulled out starting from the closed position over a first actuation portion a (cf. FIG. 27) and the first actuation part is entrained over this first actuation portion, the actuation cam 21*a* moves over the first inclined surface 10*d*. If a pivoting of the bolt part 10 about the pivot axis 11 is not blocked (by the cable-like element 12, as explained further below), the bolt part 10 is then pivoted about the pivot axis 11 starting from the passive position and assumes the first actuation position at the end of the first actuation portion. This state is shown in FIGS. 24 and 27 and likewise in FIGS. 33 and 34.

Figure 25:
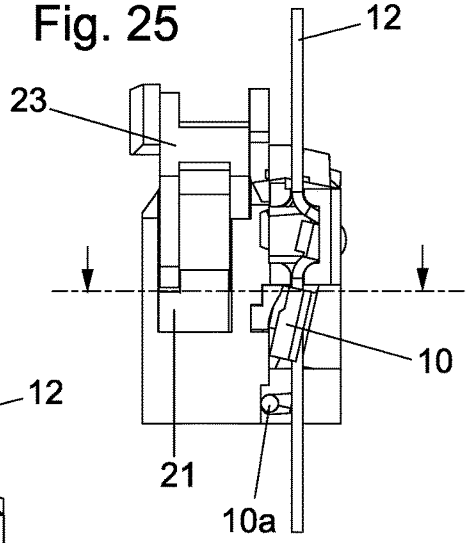
FIG. 25 shows a view analogous to FIG. 23 but in the second actuation position of the bolt part.
Figure 28:
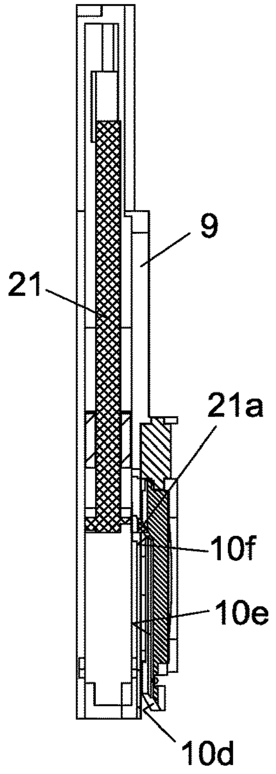

When the pull-out rail 3 is further pulled out over an intermediate portion b and the actuation part 21 is entrained over the intermediate portion, the actuation cam 21*a* moves over the intermediate surface 10*e*. Since the intermediate surface 10*e* is at least substantially parallel, preferably parallel, to the pull-out direction 4, at least substantially no, preferably no, pivoting of the bolt part 10 about the pivot axis 11 takes place in this case. If the pull-out rail 3 is further pulled out over a second actuation portion c and the actuation part 21 is entrained over the second actuation portion, the actuation cam 21*a* moves over the second inclined surface 10*f*. If the pivoting of the bolt part 10 about the pivot axis 11 is not blocked, the bolt part 10 is then pivoted about the pivot axis 11 into the second actuation position. This state is shown in FIGS. 25 and 28 and likewise in FIGS. 35 and 36.

In the exemplary embodiment, the bolt units 8 further have additional bolt parts 29. Their design and function are explained below.

Furthermore, the pull-out locking device has a cable-like element 12 which, for example, is configured in the form of a steel cable or plastic rope (monofilament or multifilament). The bolt parts 10 of all bolt units 8 interact with this cable-like element 12. In the exemplary embodiment, the cable-like element 12 is arranged next to the respective bolt part 10 with respect to a direction perpendicular to the pull-out direction 4.

The cable-like element 12 is immovably connected to the furniture carcass 5 at a first end, in the exemplary embodiment by means of a connecting piece 13. The carcass rails 1 and the first end of the cable-like element 12 are thus stationary relative to each other in the assembled state of the pull-out locking device.

The second end of the cable-like element is suspended to be movable to a limited extent. For this purpose, the second end is attached in the exemplary embodiment to an end piece 14, which is attached to a suspension part 16 by means of a tension spring 15. The tension spring 15 keeps the cable-like element 12 tensioned. The end piece 14 can be displaced in the direction towards the first end of the cable-like element until it abuts against a stop part 17, which is mounted in a stationary manner with respect to the furniture carcass 1. The cable-like element 12 is passed through a slot in the stop portion 17.

The extent to which the first end of the cable-like element 12 is displaceable is referred to in this document as the deflection reserve. In a modified exemplary embodiment, it is also possible that both ends of the cable-like element 12 are suspended to be displaceable to a limited extent. The deflection reserve would then result from the sum of the displaceability of the two ends.

Furthermore, a lock piece 18 of a lock unit 19 interacts with the cable-like element 12. The suspension part 16 and the stop part 17 can be components of a base part 20 of the lock unit. The lock piece 18 is rotatably mounted in the base part 20.

In the embodiment example, horizontal flanges of the body rail 1 of the respective pull-out guide 7 have slots extending from the rear end of the body rail 1 for the cable-like element 12 to pass through.

In the closed position of all pull-out rails 3, the bolt parts 10 of all bolt units 8 are in the passive positions. In the passive positions of all bolt parts 10 and in the open state of the lock unit 19, the deflection reserve has an initial value (=maximum value). This state is referred to as the basic state of the pull-out locking device in the context of this document and is shown in FIGS. 1 and 2.

Figure 23:
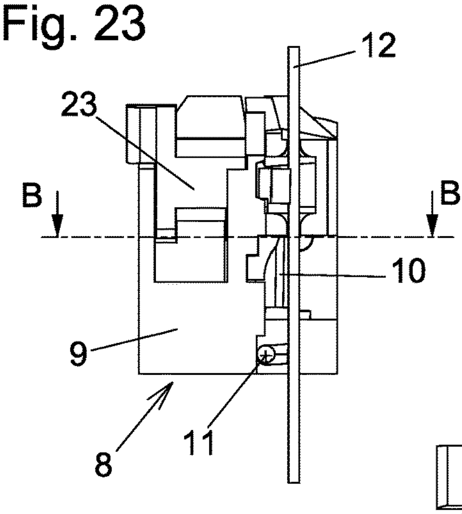
FIG. 23 shows a front view of the bolt unit in the passive position of the bolt part together with a section of the cable-like element.

In the basic state, the cable-like element 12 is not deflected by the bolt parts 10, i.e. it runs in a straight line through and/or past the bolt units 8, as can be seen, for example, in FIG. 23. Also, the cable-like element 12 is not deflected by the lock piece 18 in the release state of the pull-out locking device. In the exemplary embodiment, the cable-like element then runs in a straight line between the connecting piece 13 and the end piece 14.

If now, with reference to FIGS. 3 and 4, a first one of the pull-out rails 3 (the uppermost one in FIG. 3) is pulled out, starting from the closed position, over the first actuation portion, the associated bolt part 10 is moved into the first actuation position, as already described. In this position, it deflects the cable-like element 12 in the region of this bolt part 10 by resting with a contact surface 10*g* against the cable-like element 12 and entraining the latter, as can be seen, for example, from FIGS. 24 and 33.

During the movement of the bolt part between the passive position and the first and second actuating positions, the contact surface 10*g* moves in a direction perpendicular to the pull-out direction.

Above and below the bolt part 10 of a respective bolt unit 8, the base body 9, on which the bolt part 10 is mounted, has cable guide sections 9*a*, 9*b*, against which the cable-like element 12 is pressed by the bolt part 10 in the first actuation position of the bolt part 10 and in a second actuation position of the bolt part (see further below). By means of the cable guide sections 9*a*, 9*b*, a vertical course of the cable-like element 12 above and below the cable guide sections 9*a*, 9*b* is also achieved in the actuation positions of the bolt part 10. In the exemplary embodiment, the cable guide sections 9*a*, 9*b* have slots through which the cable-like element 12 runs.

As a result of the deflection of the cable-like element 12 in the region of the bolt part 10, the first end of the cable-like element 12 has been displaced by a certain distance in the direction of the second end. As a result, the deflection reserve has decreased by a first partial amount.

By moving the bolt part 10 from the passive position to the first actuation position, a locking portion 10*h* of the bolt part 10 is also moved from a locking position to a release position. Thus, in the closed position of the pull-out rail 3, the locking portion 10*h* assumes the locking position in which it overlaps with a locking surface 23*c* arranged on the tilting part 23 with respect to the pull-out direction 4. In the locking position of the locking portion 10*h*, the locking portion 10*h* would thus be located in the area swept by the locking surface 23*c* during the movement of the actuation part 21 from the basic position to the waiting position, in fact, the locking surface 23*c* would just abut against the locking portion 10*h* at the end of the remaining portion of the pull-out rail 3 explained further below.

Since the locking portion 10*g* is in the release position, the locking surface 23*c* can move past the locking portion 10*h* when the pull-out rail 3 is pulled out further.

If this first pull-out rail 3 is now pulled out further over the intermediate portion adjoining the first actuation portion, the associated bolt part 10 remains at least substantially in the first actuation position. At least substantially means here that the deflection reserve changes by less than 10% of the first partial amount. Deviations of the position of the intermediate surface from the alignment parallel to the pull-out direction are correspondingly small.

The length of the intermediate portion is advantageously more than three times and less than 30 times the length of the first actuation portion, wherein a value between 10 times and 20 times is preferred.

The length of the intermediate portion is advantageously 50% to 90% of the length of the pull-in portion over which the pull-out rail 3 is pulled in by the retraction spring 27.

Figure 35:
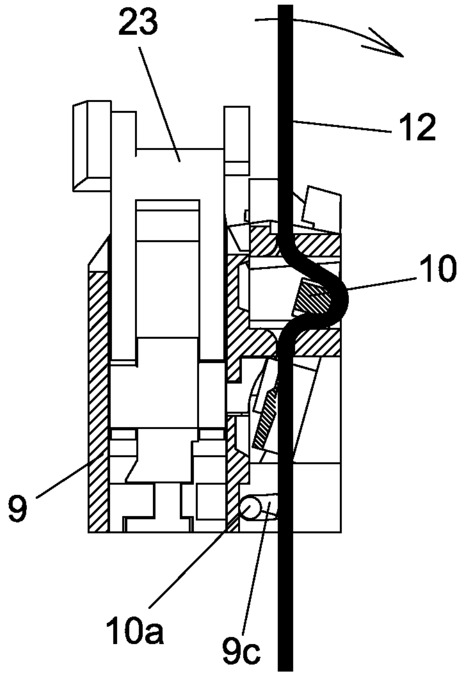
FIGS. 35 and 36 shows illustrations analogous to FIGS. 31 and 32 in the second actuation position of the bolt part.
Figure 36:
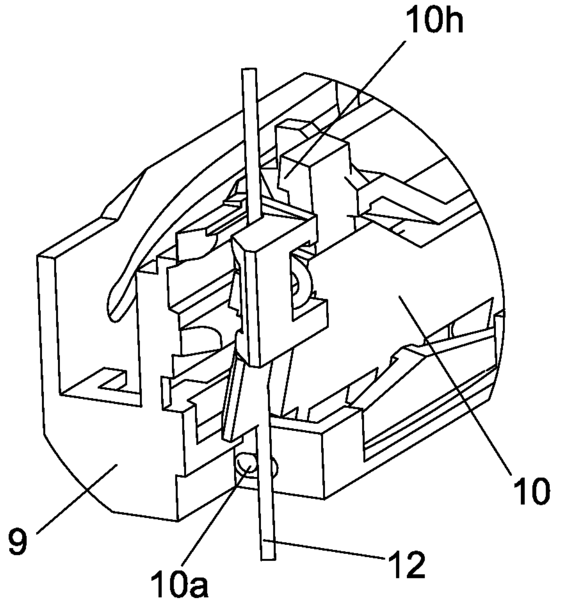

If this first pull-out rail 3 is now pulled out further over the second actuation portion adjoining the intermediate portion, the bolt part 10 is moved into the second actuation position in which it deflects the cable-like element 12 further than in the first actuation position, cf. FIGS. 25 and 35. As a result, the first end of the cable-like element 12 is displaced further in the direction of the second end and the deflection reserve is thereby reduced by a second partial amount.

When this first pull-out rail 3 is pulled out further, uncoupling of the actuation part 21 from the pull-out rail 3 takes place in the coupling position already mentioned, and the actuation part 21 remains in the waiting position and the bolt part 10 remains in the second actuation position. This coupling position of the pull-out rail 3 is after the pulling out over the second actuation portion. Advantageously, the distance of the coupling position of the pull-out rail 3 from the end of the second actuation portion is less than ten times the length of the second actuation portion. Preferably, this distance is in the range from 5 mm to 30 mm, particularly preferably in the range from 12 mm to 15 mm.

The state after the first pull-out rail has been fully pulled out to the open position is shown in FIGS. 5 and 6.

If now, starting from this state, a second one of the pull-out rails 3 is pulled out over the first actuation portion (the second uppermost in FIG. 7), the associated bolt part 10 is moved from the passive position into the first actuation position in which it deflects the cable-like element 12 in the region of this bolt part 10. The deflection reserve is thus reduced again by the first partial amount. Hence, the deflection reserve is at least substantially used up.

The fact that the deflection reserve is at least substantially used up means that a certain small amount of play can still be present. This is advantageously at least less than 50% of the first partial amount, preferably less than 25% of the first partial amount, and at least less than 50% of the second partial amount, preferably less than 25% of the second partial amount.

Figure 37:
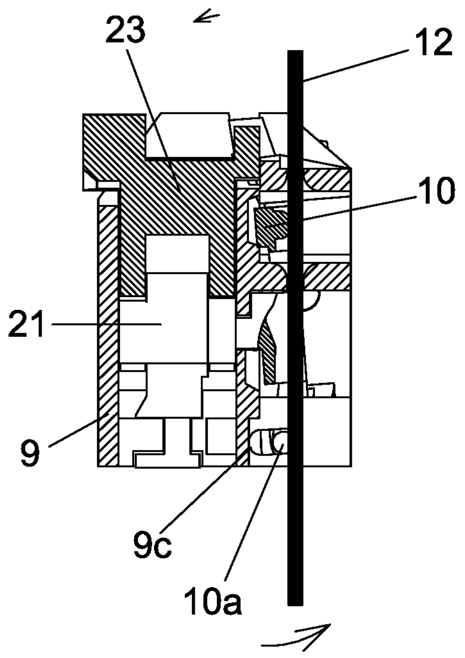
FIGS. 37 and 38 show illustrations analogous to FIGS. 31 and 32 after the associated pull-out rail has been pulled out over the remaining portion in the used-up state of the deflection reserve.
Figure 38:
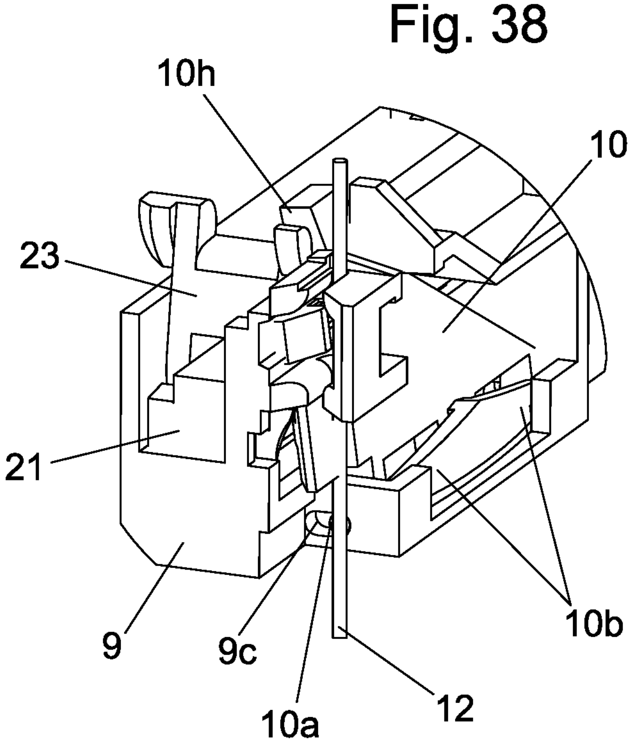

If an attempt is now made to pull out one of the drawers that is in the closed position when the deflection reserve is at least substantially used up, this is only possible over a certain remaining portion which is at least as large as the first actuation portion, but is preferably less than three times the first actuation portion. In this case, the cable-like element 12 blocks the pivoting of the bolt part 10 about the pivot axis 11, at least after the remaining play has been used up. As a result of the (further) movement of the actuation cam 21*a* over the first inclined surface 10*d*, the retaining spring 10*b* is thus deformed and the stub axles 10*a* of the bolt part 10 are displaced in the axle recesses 9*c*, namely in the direction away from the actuation part 21. Thus, the bolt part 10 pivots with the contact point of the contact surface 10*g* on the cable-like member 12 as the axis, which is parallel to the pull-out direction 4. During this pivoting, the locking portion 10*h* of the bolt part 10 remains in a position in which it overlaps with the locking surface 23*c* with respect to the pull-out direction 4, or this overlap even increases slightly. Thus, the locking portion 10*h* is in the locking position after this pull-out rail 3 has been pulled out over the remaining portion, and at the end of the remaining portion, the locking portion 10*h* rests against the locking surface 23*c* thereby blocking further pulling out of this pull-out rail 3. This situation is illustrated in FIGS. 37 and 38.

The base body 9 has a supporting surface 9*f* which supports the locking portion 10*h* of the bolt part 10, which is in the locking position, on the side opposite to the locking surface 23*c* when the actuation part 21 abuts with the locking surface 23*c* against the locking portion 10*h* of the bolt part 10. The stability of the locking of locking portion 10*h* is thereby increased. This also prevents further tension of the cable-like member and possible overstretching or breakage thereof.

If, on the other hand, starting from the basic state of the pull-out locking device, one of the pull-out rails 3 is pulled out over the first actuation portion, the bolt part 10 is pivoted about the pivot axis 11, as described, without the retaining spring 10*b* being deformed, i.e. the retaining spring is sufficiently strong so that at the end of the remaining portion, the locking portion 10*h* is in the release position in which the locking surface 23*c* and the locking portion 10*h* can move past each other.

The deflection reserve of the cable-like element 12 of the pull-out locking device can also be at least substantially used up in the closed position of all pull-out rails by actuating the lock piece 18 of the lock unit 19. By rotating the lock piece 18, an eccentric section 18*a* of the lock piece 18 comes to rest against the cable-like element 12 and deflects it, cf. in particular FIG. 10. The end piece 14 is thereby pulled to the stop part 17 and comes to rest against it (apart from any remaining play).

As a result, pulling out any of the pull-out rails 3 in the closed position is blocked at the end of the remaining portion, namely in exactly the same way as described above.

Below the lock piece 18, the lock unit 19 has a cable guide section 19*a* for the cable-like element 12, which has a slot through which the cable-like element 12 runs, so that the cable-like element 12 runs vertically below the cable guide section 19*a* even in the state deflected by the locking piece 18.

In a modified design of the lock unit, it could be provided that a lock piece of the lock unit blocks the displaceability of the first end of the cable-like element 12. This could also cause the deflection reserve to be at least substantially used up.

Now, a closer look is taken at the state in which the first pull-out rail 3 is in the open position and the second pull-out rail 3 has been displaced over the first actuation portion and the intermediate portion (and the further pull-out rails are in the closed position and the bolt unit is in the unlocked state). If an attempt is now made to pull out the second pull-out rail 3 further, this is only possible over a certain additional remaining portion, which is at least as large as the second actuation portion, but is preferably smaller than three times the second actuation portion. In this case, the cable-like element 12 blocks further pivoting of the bolt part 10 about the pivot axis 11, at least after the possibly remaining rest of the deflection reserve (due to an existing play) has been used up. As a result of the (further) movement of the actuation cam 21*a* over the second inclined surface 10*f*, the retaining spring 10*b* is deformed and the stub axles 10*a* of the bolt part 10 are displaced in the axle recesses 9*c*, namely in the direction away from the actuation part 21. Thus, the bolt part 10 pivots with the contact point of the contact surface 10*g* on the cable-like element 12 as the axis, which is parallel to the pull-out direction 4.

One of the stub axles 10*a* of the bolt part 10 is extended and it passes through an elongated hole in the additional bolt part 29, cf. e.g. FIGS. 15 and 41. The additional bolt part 29 is pivotably mounted on the base body 9. The stub axles 29*a* of the additional bolt part 29 engage in axle recesses 9*h* of the base body 9 for this purpose.

Due to the displacement of the stub axles 10*a* of the bolt part 10, the additional bolt part 29 is thus actuated by the bolt part by being pivoted with respect to the base body 9. As a result, an additional locking portion 29*b* of the additional bolt part 29 moves from a release position to a locking position. The locking position of the additional locking portion 29*b* is shown in FIGS. 39-42. In this locking position of the additional locking portion 29*b*, an additional locking surface 23*d* arranged on the tilting part 23 abuts against the additional locking portion 29*b* at the end of the additional remaining portion and blocks further pulling out of the second pull-out rail 3. This state is shown in FIGS. 39-42.

If, on the other hand, starting from the basic state of the pull-out locking device, only one of the pull-out rails 3 is pulled out over the first actuation portion and the intermediate portion and the other pull-out rails are in the closed position, the deflection reserve is at least equal to the second partial amount. Thus, when this pull-out rail is further pulled out over the second actuation portion, the bolt part 10 is pivoted about the pivot axis 11, as described, without the retaining spring 10*b* being deformed, i.e. the retaining spring is sufficiently strong for this purpose so that the additional locking portion 29*b* at the end of the additional remaining portion is in the release position in which the additional locking surface 23*d* and the additional locking portion 29*b* can move past each other.

If, starting from the open position of a first one of the pull-out rails 3 and the closed position of the further pull-out rails 3, this first pull-out rail 3 is pushed in and, after coupling of the entraining device 22 to the actuation part 21, is pulled in by the retraction spring 27, a second one of the pull-out rails 3 can already be pulled out completely immediately after this first pull-out rail has passed the second actuation portion in the direction of the closed position. Thus, a user does not have to wait for the first pull-out rail to be pulled in completely.

This displacement of the stub axles 10*a* of the bolt part 10 while deforming the retaining spring 10*b* thus represents a further actuating movement of the bolt part 10, which is present in addition to the pivoting of the bolt part 10 about the pivot axis 11.

In a modified design, the actuation part could also be designed as a one-piece tilt slide. The latter would therefore be displaceable in the pull-out direction and, at least before reaching the waiting position, simultaneously pivotable about an axis perpendicular to the pull-out direction in order to effect the uncoupling from and coupling to the entraining device. In this case, the actuation part could be guided by the base body by means of a slotted guide.

In a modified design, the locking surface and/or additional locking surface could also be arranged on the actuation part. In principle, the locking surface and/or additional locking surface could also be arranged on the pull-out rail 3.

A second exemplary embodiment of the invention is illustrated in FIGS. 43 and 44. Apart from the differences described below, the design corresponds to that of the first exemplary embodiment and the description of the first exemplary embodiment, and the modifications described therein can be referred to in an analogous manner. Here, the difference from the first exemplary embodiment is that there is no separate additional bolt part 29, but an additional locking portion 10*i* is arranged directly on the bolt part 10, namely on one of the stub axles 10*a*. If the pivoting of the bolt part 10 from the first to the second actuation position is blocked and the stub axles 10*a* move in the axle recesses 9*c* when the associated pull-out rail 3 is pulled out over the second actuation portion, this additional locking portion 10*i* moves from a release position to a locking position. At the end of the additional remaining portion, an additional locking portion 21*b* arranged on the actuation part 21 therefore abuts against this additional locking portion 10*i* and further pulling out of the pull-out rail 3 is blocked.

If no blocking of the drawers in their closed positions is desired, the lock unit could also be omitted in all exemplary embodiments.

If the cable-like element is sufficiently strong to block (further) pulling out of the pull-out rails in the used-up state of the deflection reserve, the locking portion and the additional locking portion as well as the elements for moving the same, thus, for example, also the introduction of mobility over the remaining portion and additional remaining portion by means of the retaining spring, as well as the locking surface and additional locking surface interacting with the latter could be omitted.

Further possible exemplary embodiments of the invention are shown in FIGS. 45 to 48 in simplified and highly schematized form. The differences from the previously described first exemplary embodiment of the invention will be explained below. Apart from the differences explained, the design corresponds in each case to that of the first exemplary embodiment, and the description of the first exemplary embodiment together with the described design variants can be referred to in this respect in an analogous manner.

Figure 31:
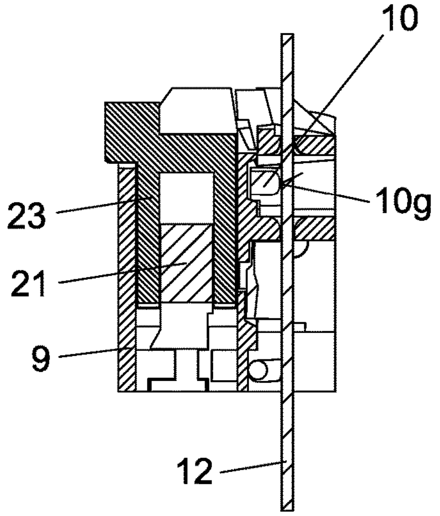
FIG. 31 shows a section along the line C-C of FIG. 20.
Figure 32:
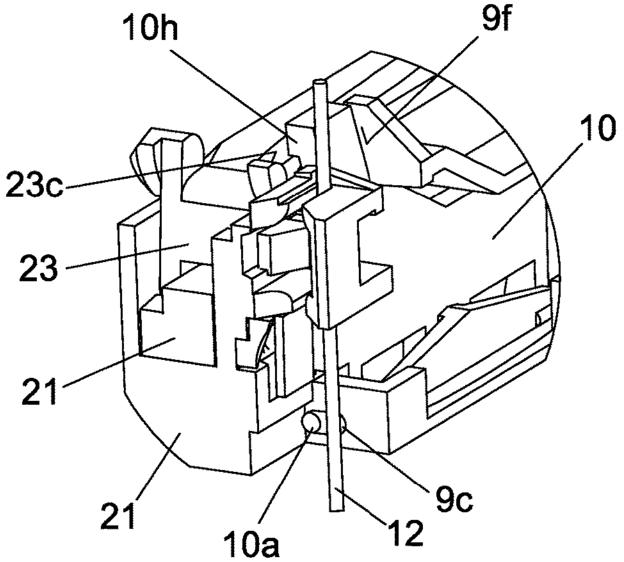
FIG. 32 shows an oblique view of a rear part of the bolt unit in the passive position of the bolt part.
Figure 33:
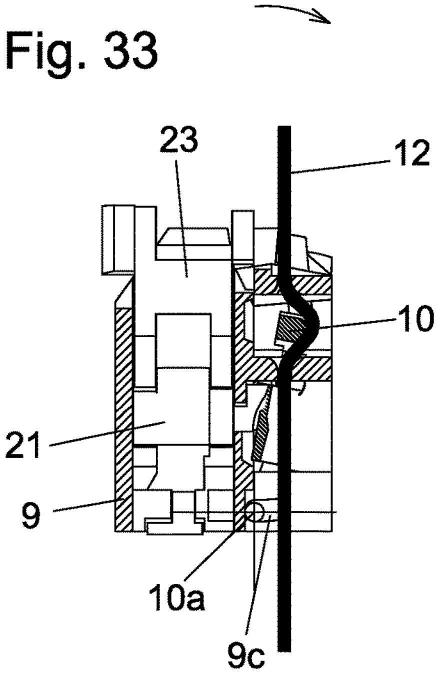
FIGS. 33 and 34 show illustrations analogous to FIGS. 31 and 32 in the first actuation position of the bolt part.
Figure 34:
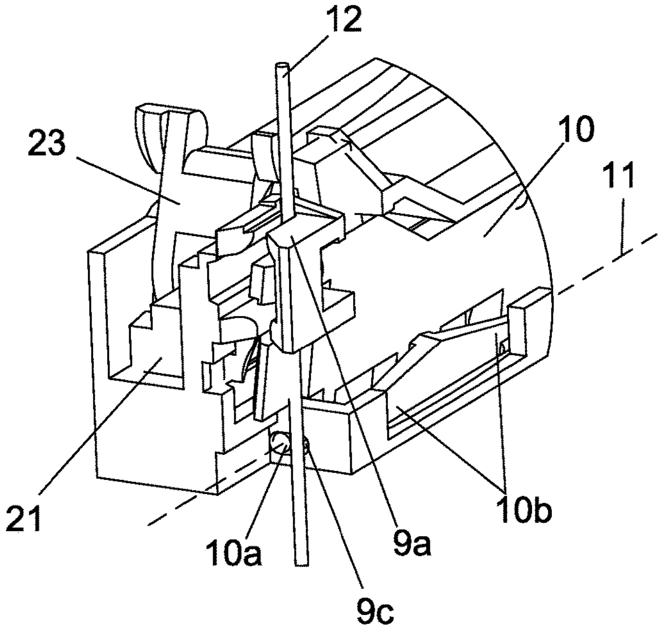
Figure 45:
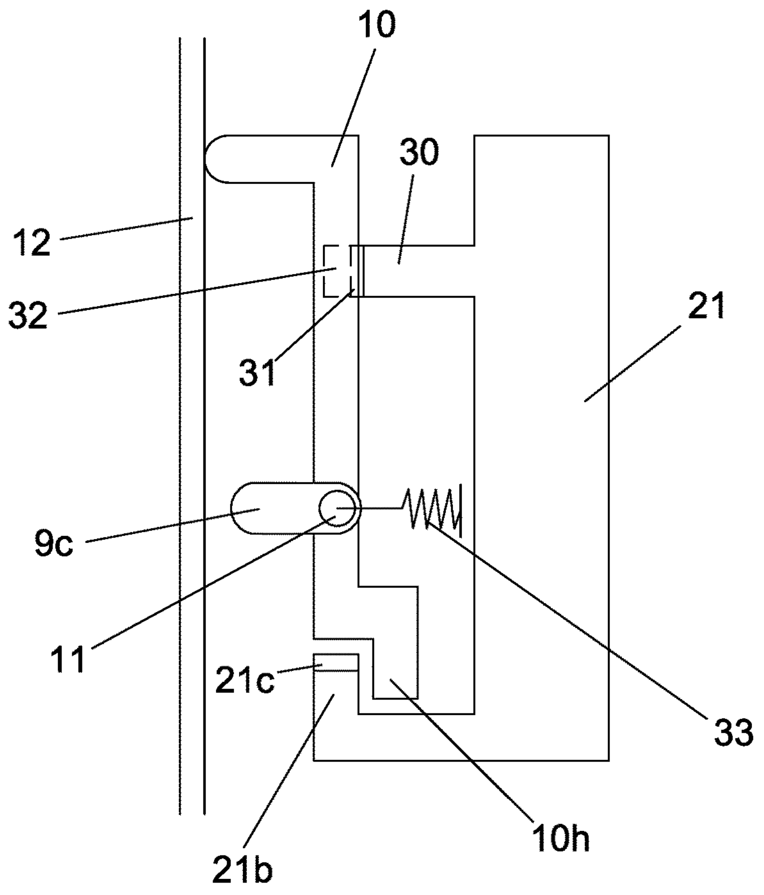
FIGS. 45 to 48 show highly schematized illustrations of further exemplary embodiments of the invention.

A third embodiment of the invention is schematically shown in cross section in FIG. 45 (similar to FIG. 31). Here, the actuation part 21 is designed again as a carriage mounted to be displaceable parallel to the pull-out direction 4 between the basic position and the waiting position by a base body which is not shown in FIG. 45 for the sake of simplicity. A tilting part, which is not shown in the figure, could in turn be pivotably mounted thereon for coupling and uncoupling an entraining device. However, the actuation part could also be designed as a one-piece tilt slide.

First and second inclined surfaces 31, 32, which are arranged here on a projection 30 of the actuation part 21 are used again for moving the bolt part 10 between the passive position, first actuation position and second actuation position. In FIG. 45, in which the passive position of the bolt part is shown in the release state of the pull-out locking device, the extent of the inclined surfaces 31, 32 is shown schematically by dashed lines. However, the inclined surfaces could also be arranged on the bolt part 10 analogously to the first exemplary embodiment. Conversely, in the first exemplary embodiment, the inclined surfaces could also be arranged on the actuation part 21.

When one of the pull-out rails is pulled out, the bolt part 10 of the associated bolt unit is moved by the actuation part 21 from the passive position into the first and second actuation positions, again by pivoting about the pivot axis 11. This pivot axis 11 is formed, for example, by at least one axle bolt which engages in one or a respective axle recess 9*c* of the base body. When the bolt part 10 is pivoted into the actuation position, the cable-like element 12 is deflected accordingly.

In the exemplary embodiment shown in FIG. 45, the locking portion 10*h* arranged on the bolt part 10 is in the release position when the bolt part 10 is in the passive position. When the bolt part is moved from the passive position to the first and second actuation positions, the release position is maintained.

A locking surface 21*c* and an additional locking surface 21*b* are located on the actuation part 21. The additional locking surface 21*b* is arranged spaced apart from the locking surface 21*c* with respect to the pull-out direction 4. To make the locking surface 21*c* visible in FIG. 45, it is schematically plotted higher than the additional locking surface 21*b*.

When one of the pull-out rails 3 is pulled out over the first actuation portion in the state in which the deflection reserve is at least substantially used up, (further) pivoting of the bolt part 10 about the pivot axis 11 is blocked at least after the deflection reserve has been completely used up, and the bolt part is therefore pivoted about the contact point on the cable-like element 12 over the remaining portion, wherein the pivot axis 11 is displaced in the at least one axle recess 9*c* formed as an elongated hole while deforming the retaining spring 33. The retaining spring 33 is shown here as a helical spring, which acts between the axle bolt and the base body. As a result of the displacement of the pivot axis 11, the locking portion 10*h* comes into overlap (with respect to the pull-out direction 4) with the locking surface 21*c*. Thus, the locking portion 10*h* is in the locking position. At the end of the remaining portion, the locking portion 10*h* thus comes to rest against the locking surface 21*c*, thereby blocking further pulling out of the pull-out rail.

In an analogous manner, the locking portion 10*h* reaches the locking position when one of the pull-out rails 3 is pulled out over the second actuation portion in the at least substantially used-up state of the deflection reserve. At the end of the additional remaining portion, the locking portion 10*h* thus comes to rest against the additional locking surface 21*b* thereby blocking the pull-out rail from being pulled out further.

In this exemplary embodiment, the locking portion 10*h* thus simultaneously forms an additional locking portion for interacting with the additional locking surface.

In a modification of this exemplary embodiment, the bolt part 10 could have a locking portion and an additional locking portion spaced apart therefrom with respect to the pull-out direction, which interact with a common locking surface of the actuation part 21. The locking surface could then simultaneously form the additional locking surface.

Figure 46:
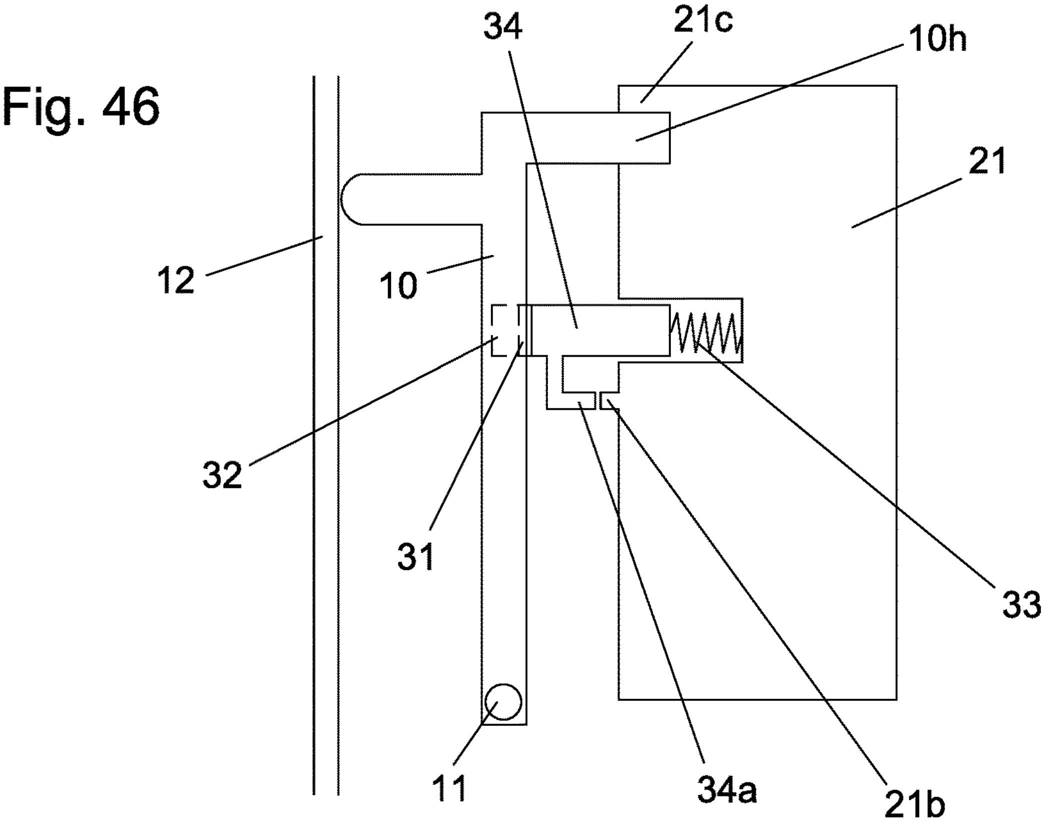

A fourth exemplary embodiment of the invention is shown in FIG. 46. The actuation part 21 is operatively connected to the bolt part 10 via a transmission part 34. The inclined surfaces 31, 32, which move the bolt part between the passive position and the first and second actuating positions, are arranged on the transmission part 34 and interact with the bolt part 10. It would again also be conceivable and possible for the inclined surfaces to be arranged on the bolt part 10 and to interact with the transmission part 34. The transmission part 34 is displaceably mounted in a recess of the actuation part 21 and is pressed against the bolt part 10 by a retaining spring 33.

In the passive position of the bolt part 10, a locking portion 10*h* of the bolt part 10 is in the locking position. If, in the basic state of the pull-out locking device, the associated pull-out rail 3 is pulled out starting from the closed position and the actuation part 21 is initially entrained in the course of this, the bolt part 10 is displaced over the remaining portion by the inclined surface of the transmission part 32 before the locking surface 21*c* of the actuation part 21 abuts against the locking portion 10*h* of the bolt part 10 by deflecting the cable-like element 12 from the passive position into the first actuation position, in this exemplary embodiment is pivoted again for this purpose about the pivot axis 11. In this case, the retaining spring 33 is again dimensioned such that it does not yield. At the end of the remaining portion, the locking portion 10*h* is moved out of overlap with the locking surface 21*c* and the actuation part 21 can move past the bolt part 10. If pulling out the pull-out rail 3 associated with the bolt unit shown takes place in the used-up state of the deflection reserve, the cable-like element 12 blocks a movement of the bolt part 10 from the passive position to the first actuation position. When the transmission part 34 is pulled out over the remaining portion, it is pressed into the recess of the actuation part 21 against the force of the retaining spring 33 and with deformation of the retaining spring 33. The locking portion 10*h* thus remains in the locking position and, at the end of the remaining portion, the locking surface 21*c* of the actuation part 21 moves against the locking portion 10*h* and further pulling out of the associated pull-out rail 3 is blocked.

When one of the pull-out rails 3 is pulled out over the second actuation portion in the at least substantially used-up state of the deflection reserve, the transmission part 34 is pressed into the recess of the actuation part 21 against the force of the retaining spring 33 and with deformation of the retaining spring 33. The additional locking portion 34*a* arranged on the transmission part 34 thus comes into a locking position. At the end of the additional remaining portion, the additional locking portion 34*a* thus comes to rest against an additional locking surface 21*b* arranged on the actuation part 21, as a result of which further pulling out of the pull-out rail 3 is blocked.

Figure 47:
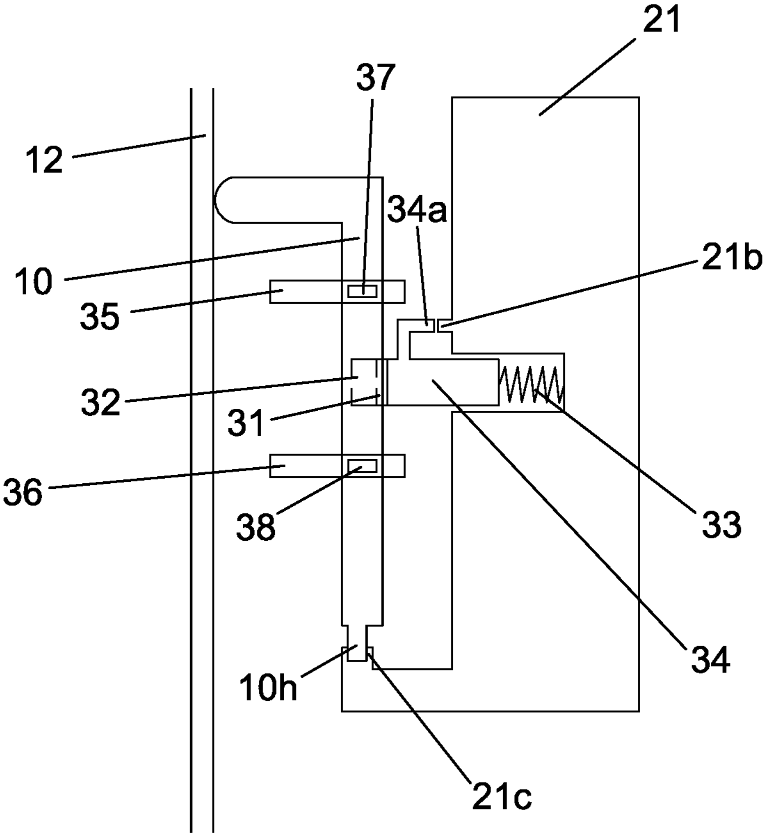

A fifth exemplary embodiment example of the invention is shown in FIG. 47. This exemplary embodiment example is configured similar to the fourth embodiment example. Here too, a transmission part 34 can be pressed into a recess of the actuation part 21 against the force of a retaining spring 33. Likewise, the locking portion 10*h* of the bolt part 10 is in its locking position when the bolt part 10 is in the passive position. However, during the movement between the passive position and the first and second actuation positions, the bolt part 10 is not pivotable here about a pivot axis but is mounted to be displaceable in a straight line by the base body perpendicular to the pull-out direction 4. For example, grooves 35, 36 in which guide lugs 37, 38 of the bolt part 10 engage, can be provided in the base body 9 for this purpose.

In the fourth and fifth embodiments, the transmission part 34 could also be mounted in a recess of the bolt part to be slidable against the force of a retaining spring. The transmission part 34 could then have inclined surfaces interacting with the actuation part 21, or inclined surfaces interacting with the transmission part could be arranged on the transmission part.

Figure 48:
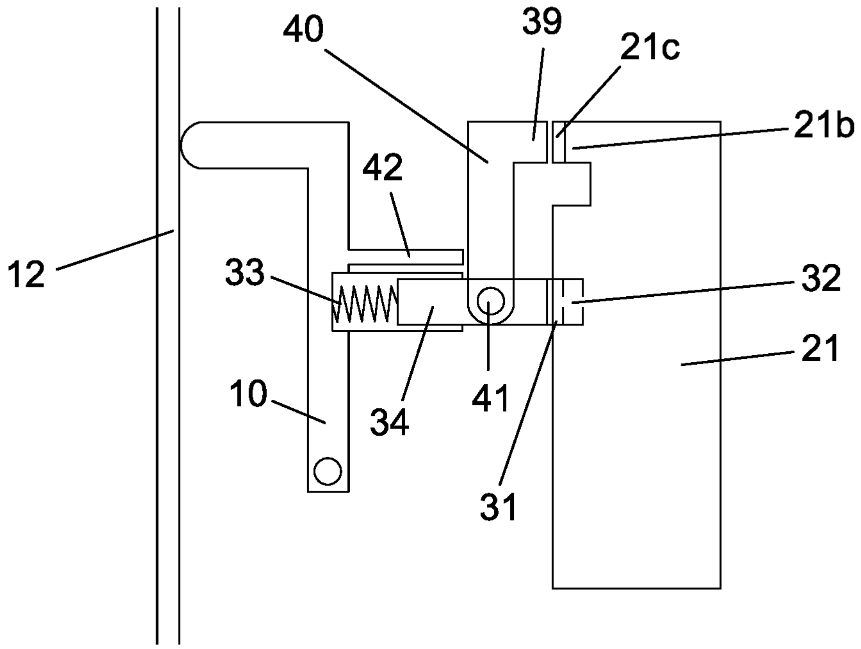

A sixth exemplary embodiment of the invention is shown in FIG. 48. Here, the transmission part 34 is mounted in a recess of the bolt part 10 to be displaceable against the force of the retaining spring 33 and has inclined surfaces interacting with the actuation part 21.

In contrast to the previously illustrated embodiments, the locking portion 39 is arranged here on a separate component, which is designed as a pivot arm 40. This pivot arm 40 is mounted on the transmission part 34 to be pivotable about an axle 41. In the inserted state of the associated pull-out rail, the locking portion 39 assumes the release position in this exemplary embodiment. The locking portion remains in this position when the associated pull-out rail is pulled out in the basic state of the pull-out locking device, wherein the bolt part 10 is displaced against the cable-like element 12 over the first actuation portion, wherein the cable-like element 12 is deflected and the retaining spring 33 does not yield. If, on the other hand, the pull-out rail is pulled out over the remaining portion in the used-up state of the deflection reserve, the transmission part 34 is pressed into the recess in the bolt part 10 with deformation of the retaining spring 33, and the actuating arm 42 of the bolt part 10 abuts against the pivot arm 40 and pivots the latter about the axle 41 into the locking position, in which the locking portion 39 overlaps with the locking surface 21*c* on the actuation part 21 with respect to the pull-out direction 4. Further pulling out of the pull-out rail is then blocked at the end of the remaining portion.

When one of the pull-out rails 3 is pulled out over the second actuation portion in the at least substantially used-up state of the deflection reserve, the transmission part 34 is pressed into the recess of the bolt part 10 against the force of the retaining spring 33 and with deformation of the retaining spring 33. The locking portion 39 arranged on the transmission part 34 thus moves into the locking position. At the end of the additional remaining portion, the locking portion 39 thus comes to rest against an additional locking surface 21*b* arranged on the actuation part 21 and spaced apart from the locking surface 21*c* with respect to the pull-out direction, as a result of which further pulling out of the pull-out rail 3 is blocked.

Thus, in this exemplary embodiment, the locking portion 39 simultaneously forms an additional locking portion interacting with the additional locking surface 21*b*.

The invention claimed is:

1. A pull-out locking device for pull-out guides of drawers, comprising at least two pull-out guides which each have a carcass rail which can be attached to a common furniture carcass and a pull-out rail which can be attached to a respective one of the drawers and can be pulled out in a pull-out direction over a pull-out portion from a closed position into a pull-out position, bolt units associated with a respective one of the pull-out guides, each of which bolt units has a base body attached to the carcass rail and a bolt part which is movably mounted by the base body and can be moved by an actuation part which, when the associated pull-out rail is pulled out, is moved together with the pull-out rail, starting from the closed position, at least over part of the pull-out portion, a cable-like element, at least one end of which is held to be displaceable to a limited extent, wherein the displaceability of the one end or of both ends together form a deflection reserve of the cable-like element, which deflection reserve assumes an initial value in a basic state of the pull-out locking device in which all the pull-out rails are in the closed position, and wherein the cable-like element, in the case of a movement of a respective one of the bolt parts starting from the passive position, can be deflected by the bolt part in the region of the bolt part while reducing the deflection reserve, wherein when, starting from the basic state of the pull-out locking device, one of the pull-out rails is pulled out over a first actuation portion adjoining its closed position, the associated bolt part is moved by the actuation part from a passive position into a first actuation position and the deflection reserve is reduced by a first partial amount and, when the pull-out rail is pulled out further over an intermediate portion which adjoins the first actuation portion and which is at least three times longer than the first actuation portion, the associated bolt part remains at least substantially in the first actuation position and when the pull-out rail is pulled out further over a second actuation portion adjoining the intermediate portion, the associated bolt part is moved by the actuation part into a second actuation position and the deflection reserve is reduced by a second partial amount, and in that in the state in which one of the pull-out rails is pulled out over the first actuation portion, the intermediate portion and the second actuation portion and another one of the pull-out rails is pulled out over the first actuation portion and the remaining ones of the pull-out rails are in the closed position, the deflection reserve is at least substantially used up.

2. The pull-out locking device according to claim 1, wherein the bolt part has a first inclined surface which extends at a first angle obliquely to the pull-out direction and with which the actuation part interacts over the first actuation portion, a second inclined surface which extends at a second angle obliquely to the pull-out direction and with which the actuation part interacts over the second actuation portion, and an intermediate surface which extends between the first and second inclined surfaces and which extends at least substantially parallel to the pull-out direction.

3. The pull-out locking device according to claim 1, wherein the actuation parts are each mounted by the base bodies to be movable between a basic position and a waiting position and interact with an entraining device of the respectively associated pull-out rail, wherein in the closed position of the associated pull-out rail, the respective actuation part assumes the basic position in which the entraining device is coupled to the actuation part and, when the associated pull-out rail is pulled out over the first actuation portion, the intermediate portion and the second actuation portion are moved by the entraining device against the force of a retraction spring into the waiting position in which the entraining device uncouples from the actuation part and in which the actuation part is held against the force of the retraction spring when the pull-out rail is pulled out further.

4. The pull-out locking device according to claim 3, wherein the movement of the actuation part from the waiting position to the basic position is damped by a slide-in damper.

5. The pull-out locking device according to claim 1, wherein in a state of the pull-out locking device in which the deflection reserve is at least substantially used up, a respective one of the pull-out rails located in the closed position can be pulled out over a remaining portion which is at least equal to the first actuation portion and less than three times the first actuation portion, wherein, during the pulling out over the first actuation portion, a retaining spring arranged in a force transmission path between the bolt part and the base body, by which the bolt part is supported, is deformed due to the blocking of the movement of the associated bolt part from the passive position into the first actuation position effected by the cable-like element, wherein, after this pull-out rail has been pulled out over the first actuation portion, a locking portion arranged on the associated bolt part or actuated by the bolt part is in a locking position in which it blocks further pulling out of this pull-out rail at the end of the remaining portion by resting against a locking surface which is moved together with this pull-out rail, and in that, when one of the pull-out rails is pulled out starting from the basic state of the pull-out locking device, the locking portion, at least at the end of the remaining portion, is in a release position in which the locking portion and the locking surface move past one another when the pull-out rail is pulled out further.

6. The pull-out locking device according to claim 5, wherein, in the closed position of a respective pull-out rail, the respective associated locking portion is in the locking position and when one of the pull-out rails is pulled out over the remaining portion, starting from the basic state of the pull-out locking device, it reaches the release position by the movement of the bolt part from the passive position to the first actuation position.

7. The pull-out locking device according to claim 5, wherein in the closed position of a respective pull-out rail, the respective associated locking portion is in the release position and, when the pull-out rail is pulled out over the remaining portion, starting from the state of the pull-out locking device in which the deflection reserve is at least substantially used up and the movement of the bolt part into the first actuation position is blocked, is moved into the locking position by an actuating movement of the bolt part accompanied by the deformation of the retaining spring or of a transmission part arranged between the bolt part and the actuation part and acted upon by the retaining spring.

8. The pull-out locking device according to claim 5, wherein the respective locking surface is arranged on the respective actuation part or a tilting part pivotably connected thereto.

9. The pull-out locking device according to claim 5, wherein in a state of the pull-out locking device in which the deflection reserve is at least substantially used up, wherein a first one of the pull-out rails is in the open position and a second one of the pull-out rails is pulled-out over the first actuation portion and the intermediate portion, this second pull-out rail can still be pulled-out further over an additional remaining portion which is at least equal to the second actuation portion and less than three times the second actuation portion, wherein, when the second pull-out rail is pulled out over the additional remaining portion, the retaining spring is deformed due to the blocking of the movement of the associated bolt part from the first actuation position into the second actuation position, which is effected by the cable-like element, wherein, after the second pull-out rail has been pulled out over the second actuation portion, an additional locking portion arranged on the associated bolt part or actuated by the bolt part is in a locking position in which, after the second pull-out rail has been pulled out over the additional residual portion, it blocks further pulling out of this pull-out rail by resting against an additional locking surface which is moved together with the second pull-out rail, and in that, in a state of the pull-out locking device in which, after one of the pull-out rails has been pulled out over the first actuation portion and the intermediate portion, the deflection reserve is at least equal to the second partial amount, the additional locking portion at least at the end of the additional remaining portion, is in a release position in which the additional locking portion and the additional locking surface move past one another during the further pulling out of this pull-out rail.

10. The pull-out locking device according to claim 9, wherein the respective additional locking surface is arranged on the respective actuation part or a tilting part pivotably connected thereto.

11. The pull-out locking device according to claim 9, wherein the additional locking portion is identical to the locking portion and the additional locking surface is spaced apart from the locking surface with respect to the pull-out direction, or in that the additional locking surface is identical to the locking surface and the additional locking portion is spaced apart from the locking portion with respect to the pull-out direction.

12. The pull-out locking device according to claim 11, wherein the pivot axis is displaceable with respect to the base body against the force of the retaining spring.

13. The pull-out locking device according to claim 1, wherein the bolt part is mounted on the base body to be pivotable about a pivot axis and the movement between the passive position and the first and second actuating positions is carried out by pivoting about the pivot axis.

14. The pull-out locking device according to claim 1, wherein a respective base body has cable guide sections for the cable-like element arranged above and below the point of deflection of the cable-like element by the associated bolt part.

15. The pull-out locking device according to claim 1, wherein a lock unit is provided by which, starting from the basic state of the pull-out locking device, the deflection reserve can be at least substantially used up by deflecting the cable-like element or by blocking the displaceability of the at least one movably mounted end of the cable-like element.

* * * * *